US009746326B2

(12) United States Patent
Fujii et al.

(10) Patent No.: US 9,746,326 B2
(45) Date of Patent: Aug. 29, 2017

(54) DRIVE APPARATUS, PHYSICAL QUANTITY DETECTION APPARATUS, AND ELECTRONIC APPARATUS

(71) Applicant: Panasonic Intellectual Property Management Co., Ltd., Osaka (JP)

(72) Inventors: Takeshi Fujii, Osaka (JP); Takeshi Uemura, Osaka (JP); Hideaki Fujiura, Osaka (JP); Yasunobu Tsukio, Osaka (JP); Kenichi Yasaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 94 days.

(21) Appl. No.: 14/888,443

(22) PCT Filed: Jun. 30, 2014

(86) PCT No.: PCT/JP2014/003460
§ 371 (c)(1),
(2) Date: Nov. 2, 2015

(87) PCT Pub. No.: WO2015/004872
PCT Pub. Date: Jan. 15, 2015

(65) Prior Publication Data
US 2016/0116287 A1 Apr. 28, 2016

(30) Foreign Application Priority Data

Jul. 12, 2013 (JP) ................................. 2013-146127
Oct. 22, 2013 (JP) ................................. 2013-218859

(51) Int. Cl.
*G01C 19/5776* (2012.01)
*G01C 19/56* (2012.01)

(52) U.S. Cl.
CPC ......... *G01C 19/5776* (2013.01); *G01C 19/56* (2013.01)

(58) Field of Classification Search
CPC ........................... G01C 19/56; G01C 19/5776
See application file for complete search history.

(56) References Cited

U.S. PATENT DOCUMENTS

| 6,150,879 A | 11/2000 | Watanabe |
| 6,220,094 B1 * | 4/2001 | Ichinose ............ G01C 19/5607 73/1.77 |

(Continued)

FOREIGN PATENT DOCUMENTS

| JP | 11-098010 | 4/1999 |
| JP | 2000-057765 | 2/2000 |

(Continued)

OTHER PUBLICATIONS

International Search Report of PCT application No. PCT/JP2014/003460 dated Aug. 5, 2014.

*Primary Examiner* — Erika J Villaluna
(74) *Attorney, Agent, or Firm* — McDermott Will & Emery LLP

(57) ABSTRACT

A driver apparatus includes a vibrator and a drive circuit configured to input a drive signal to the vibrator to vibrate the vibrator. The drive circuit includes an output amplifier configured to output the drive signal to the vibrator based on a monitor signal, a power supply unit configured to supply a power supply voltage, and a power supply voltage controller configured to control the power supply voltage and to supply the controlled power supply voltage to the output amplifies. This driver apparatus can increase amplitude of the vibration of the vibrator, and can increase detection sensitivity to a physical quantity detection apparatus including the driver apparatus.

19 Claims, 37 Drawing Sheets

(56) References Cited

U.S. PATENT DOCUMENTS

| 8,240,204 B2* | 8/2012 | Kanai | G01C 19/56 73/497 |
|---|---|---|---|
| 2005/0178202 A1 | 8/2005 | Uehara | |
| 2006/0277995 A1 | 12/2006 | Kutsuna | |
| 2009/0084180 A1 | 4/2009 | Yoshida et al. | |

FOREIGN PATENT DOCUMENTS

| JP | 2001-116553 | 4/2001 |
| JP | 2005-227234 | 8/2005 |
| JP | 2006-349409 | 12/2006 |
| JP | 2007-178298 | 7/2007 |
| JP | 2009-031007 | 2/2009 |
| JP | 2010-054431 | 3/2010 |
| JP | 2010-156657 | 7/2010 |
| JP | 2011-002295 | 1/2011 |
| JP | 2012-013529 | 1/2012 |
| JP | 2012-215503 | 11/2012 |

\* cited by examiner

FIG. 23

| Boosting Ratio | Output Current Capability (I×t) | | |
|---|---|---|---|
| | Booster Circuit 10 | Booster Circuit 520 | Booster Circuit 501 of Comparative example |
| 1.25×Vin | 5.0×Vin×C (=1.25×Vin×C×4) | 5.0×Vin×C (=1.25×Vin×C×4) | 5.0×Vin×C (=1.25×Vin×C×4) |
| 1.5×Vin | 6.0×Vin×C (=1.5×Vin×C×4) | 6.0×Vin×C (=1.5×Vin×2×C×2) | 1.5×Vin×C (=1.5×Vin×C/2×2) |
| 2.0×Vin | 8.0×Vin×C (=2×Vin×C×4) | 8.0×Vin×C (=2×Vin×2×C×2) | 2.0×Vin×C (=2×Vin×C/2×2) |

DRIVE APPARATUS, PHYSICAL QUANTITY DETECTION APPARATUS, AND ELECTRONIC APPARATUS

This application is a U.S. national stage application of the PCT international application No.PCT/JP2014/003460 filed on Jun. 30, 2014, which claims the benefit of foreign priority of Japanese patent application No. 2013-146127 filed on Jul. 12, 2013 and Japanese patent application No. 2013-218859 filed on Oct. 22, 2013, the contents all of which are incorporated herein by reference.

TECHNICAL FIELD

The present invention relates to a driver apparatus, a physical quantity detection apparatus such as a vibration type angular velocity sensor, and an electronic apparatus.

BACKGROUND ART

A physical quantity detection apparatus having a configuration applying a drive voltage to a vibrator is known. The physical quantity detection apparatus is disclosed in, for example, PTL 1. In the physical quantity detection apparatus, a drive voltage to be applied to the vibrator necessarily increases in order to increase detection sensitivity to a physical quantity.

CITATION LIST

Patent Literature

PTL 1: Japanese Patent Laid-Open Publication No. 2001-116553

SUMMARY

In the conventional physical quantity detection apparatus, it may be difficult to sufficiently increase detection sensitivity to a physical quantity at a high temperature (or a low temperature) and to sufficiently increase detection sensitivity of the physical quantity also at a room temperature. That is, it may be difficult to sufficiently increase a drive voltage at a high temperature (or a low temperature) and to sufficiently increase a drive voltage also at a room temperature.

In this description, the following driver apparatus will be disclosed. The driver apparatus includes a vibrator configured to vibrate in response to a drive signal input thereto and to output a monitor signal in response to the vibration, and a drive circuit configured to input the drive signal to the vibrator to vibrate the vibrator. The drive circuit includes an output amplifier configured to output the drive signal to the vibrator based on the monitor signal, a power supply unit configured to supply a power supply voltage, and a power supply voltage controller configured to control the power supply voltage and to supply the controlled power supply voltage to the output amplifier.

This driver apparatus can increase amplitude of the vibration of the vibrator, and can increase detection sensitivity to a physical quantity detection apparatus including this driver apparatus.

BRIEF DESCRIPTION OF DRAWINGS

FIG. 23 illustrates output current capability of the booster circuit according to Embodiment 4.

DETAIL DESCRIPTION OF PREFERRED EMBODIMENTS

Exemplary embodiments will be described below. Contents described in the embodiments can be combined in a range without inconsistency.

Exemplary Embodiment 1

Figure 1A:
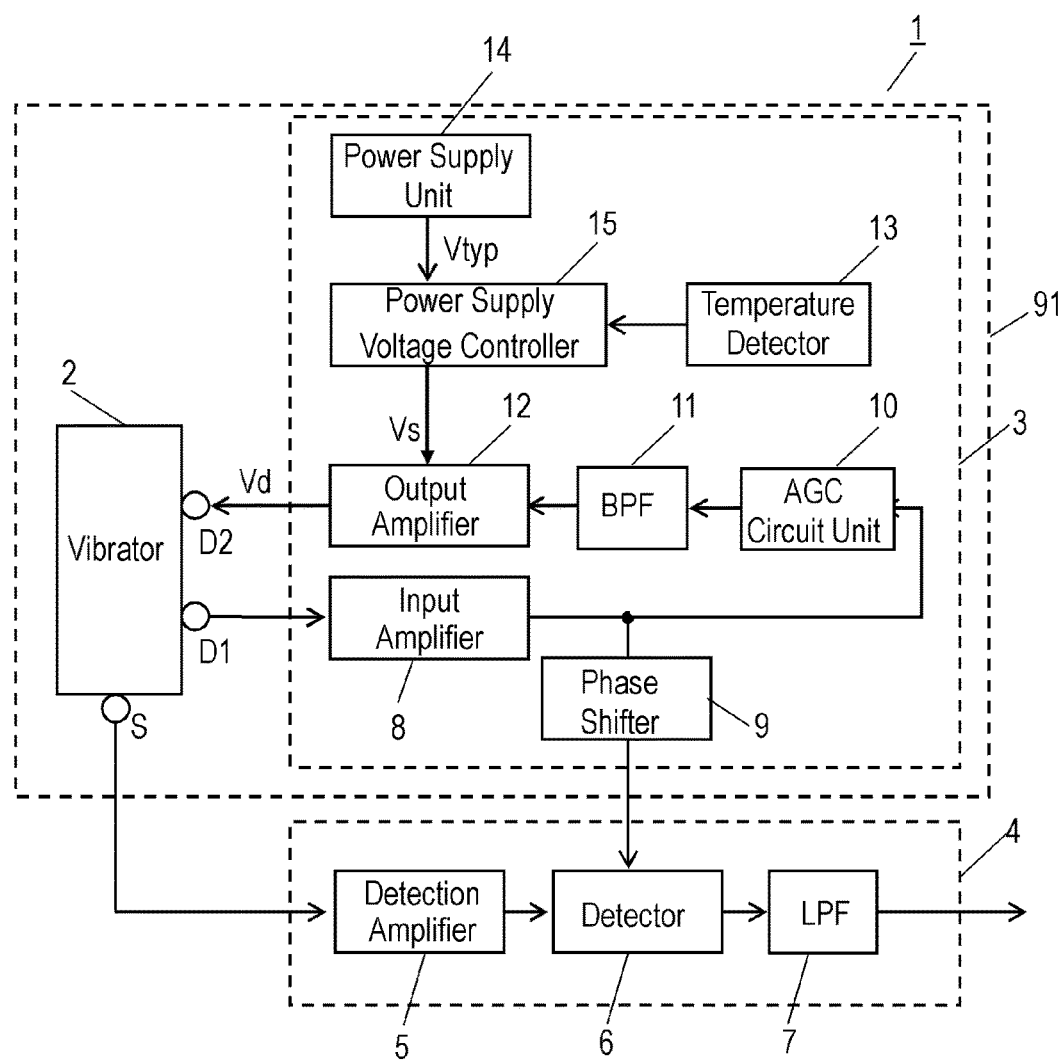
FIG. 1A is a block diagram of a physical quantity detection apparatus according to Exemplary Embodiment 1.

FIG. 1A is a block diagram of physical quantity detection apparatus 1 according to Exemplary Embodiment 1. Physical quantity detection apparatus 1 includes driver apparatus 91 and detection circuit 4. Driver apparatus 91 includes vibrator 2 and drive circuit 3 connected to vibrator 2 to constitute an oscillation loop. Drive circuit 3 supplies a drive signal to vibrator 2 to drive vibrator 2 and vibrates vibrator 2 at a vibration frequency. Vibrator 2 is vibrated with the drive signal, and outputs a monitor signal in response to the vibration. Drive circuit 3 includes output amplifier 12 configured to output the drive signal to vibrator 2, power supply unit 14 configured to supply power supply voltage Vtyp to output amplifier 12, and power supply voltage controller 15. Power supply voltage Vtyp is input to power supply voltage controller 15. Power supply voltage controller 15 is configured to control power supply voltage Vtyp to supply controlled power supply voltage Vs to output amplifier 12.

Drive circuit 3 may further include temperature detector 13. In this case, power supply voltage controller 15 controls power supply voltage Vtyp based on a temperature detected by temperature detector 13 to supply controlled power supply voltage Vs to output amplifier 12.

This configuration, even in a case where a temperature changes, allows driver apparatus 91 to output a drive signal of a voltage having a proper level while preventing saturation of the drive voltage, and can achieve both improvement of a sensitivity characteristic and a temperature characteristic.

Physical quantity detection apparatus 1 according to Embodiment 1 is, for example, an angular velocity sensor that detects an angular velocity. A configuration and operation of the quantity detection apparatus will be described below.

Drive circuit 3 constitutes the oscillation loop with vibrator 2, and drives and vibrates vibrator 2 in the oscillation loop.

Drive circuit 3 operates between high potential VDD and ground potential GND (low potential) lower than high potential VDD. However, analog ground AGND can be used instead ground potential GND. Analog ground AGND has a reference potential of drive circuit 3, and does not necessarily coincide with ground potential GND. More specifically, a usable power supply potential is different in accordance of a type of vibrator 2.

In a case where vibrator 2 is a capacitive coupling type vibrator, such as a piezoelectric vibrator, a direct-current (DC) component of the oscillation loop does not relate to oscillation drive of vibrator 2. Therefore, when amplitude of a voltage of the drive signal of the oscillation loop can be adjusted to a desired level, vibrator 2 can be driven, and magnitude of the DC component of the voltage of the drive signal can be arbitrarily determined. Accordingly, as the low potential, arbitrary potential including ground potential GND or analog ground AGND can be used.

In a case where vibrator 2 is a variable resistance vibrator, a bias voltage of the oscillation loop is determined to be a desired level, and therefore it is preferable to use analog ground AGND of a desired level that is a power supply voltage of the circuit.

Driver apparatus 91 according to Embodiment 1 may employ any of the above types of vibrator 2.

According to Embodiment 1, vibrator 2 is the piezoelectric vibrator, and the drive circuit operates between high potential VDD (e.g. 3 V) and ground potential GND. Vibrator 2 generates a detection signal (charges) in response to an inertial force externally applied thereto. Detection circuit 4 detects the detection signal (charges).

Detection circuit 4 includes detection amplifier 5, detector 6, and low pass filter (LPF) 7. According to Embodiment 1, detection amplifier 5 is an I/V conversion amplifier that converts a current input thereto into a voltage and outputs the converted voltage.

Drive circuit 3 further includes input amplifier 8, phase shifter 9, automatic gain control (AGC) circuit unit 10, and bandpass filter (BPF) 11. Input amplifier 8 provided at an initial stage of drive circuit 3 includes an operational amplifier, feedback resistor Rf and feedback capacitance Cf, and is an integral type current/voltage conversion amplifier having a low pass filter characteristic. The monitor signal output from vibrator 2 is a flow of charges, namely a current. Input amplifier 8 is one of components of the oscillation loop, and converts the monitor signal which is the current output from vibrator 2 into a voltage signal. Input amplifier 8 having the low pass filter characteristic can effectively prevent unnecessary oscillation. Phase shifter 9 shifts a phase of this voltage signal by 90 degrees and outputs the voltage signal having the shifted phase to detection circuit 4. AGC circuit unit 10 has a gain of the oscillation loop automatically adjusted in response to this voltage signal.

AGC circuit unit 10 includes a rectifier, a smoother, a reference signal source, a comparator, and a variable gain amplifier. AGC circuit unit 10 automatically adjusts a gain of the variable gain amplifier, such that a loop gain of the oscillation loop, becomes 1 in a state where the oscillation is stable. Output amplifier 12 provided at a post stage of drive circuit 3 outputs, to vibrator 2, a drive signal obtained by amplifying a signal from AGC circuit unit 10. More specifically, the signal from AGC circuit unit 10 is input to output amplifier 12 via BPF 11.

Vibrator 2 is connected to drive circuit 3. Vibrator 2 has monitor terminal D1 that outputs the monitor signal, drive terminal D2 that inputs the drive signal to vibrator 2, and detection terminal S that outputs the detection signal from vibrator 2.

A configuration and operation of detection circuit 4 will be described below. During a normal operation, vibration in a predetermined direction at drive vibration frequency fd is generated in vibrator 2 by the oscillation loop including drive circuit 3. When vibrator 2 rotates while vibrating, a Coriolis force in a direction perpendicular to the drive vibration is generated due to the rotation. According to the vibration due to the Coriolis force, the detection signal (charges) is output from detection terminal S, and is input to detection amplifier 5 provided at an initial stage of detection circuit 4.

An unnecessary component generated by leakage of the drive vibration is added to the detection signal. The detection signal is generated from a vibration direction perpendicular to the drive vibration. Therefore, both a frequency of the detection signal due to the Coriolis force and a frequency of the unnecessary signal have drive vibration frequency fd, and a phase of the detection signal and a phase of the unnecessary signal are different from each other by 90 degrees. In order to remove the unnecessary component, detector 6 performs synchronous detection of the detection signal by using a reference signal for synchronous detection from drive circuit 3. The reference signal for synchronous detection is output from phase shifter 9 that shifts the phase of a signal output from input amplifier 8 of drive circuit 3 by a predetermined phase.

In a state where a constant angular velocity is applied to vibrator 2, the signal that is synchronously detected and output by detector 6 includes a DC component due to the Coriolis force, and a component having a frequency (2×fd) due to the unnecessary signal.

Low pass filter 7 removes an alternating-current (AC) component having the frequency (2×fd) due to the unnecessary signal from the detected signal, and outputs a direct current that is a desired angular velocity signal corresponding to the angular velocity applied to vibrator 2.

Drive circuit 3 includes output amplifier 12 configured to output the drive signal to vibrator 2, temperature detector 13 configured to detect an ambient temperature, power supply unit 14 configured to supply power supply voltage Vtyp to output amplifier 12 as power supply voltage Vs, and power supply voltage controller 15 configured to control power supply voltage Vs based on the temperature detected by temperature detector 13.

Detection sensitivity to physical quantity detection apparatus 1 depends on amplitude of mechanical vibration of vibrator 2. A relation between a drive voltage of vibrator 2 and the amplitude of the mechanical vibration changes according to the temperature. The relation is influenced by factors including a temperature characteristic of the material of vibrator 2, the structure, such as the shape and size, of vibrator 2, and a temperature characteristic of viscosity of air around vibrator 2. Generally, vibrator 2 hardly vibrates mechanically at a temperature higher or lower than a room temperature. AGC circuit unit 10 controls the drive signal to cause amplitude of a voltage of the drive signal from output amplifier 12 to be larger at a higher temperature or a lower temperature than a room temperature, in order to make amplitude of vibration of vibrator 2 constant regardless the temperature.

Figure 1B:
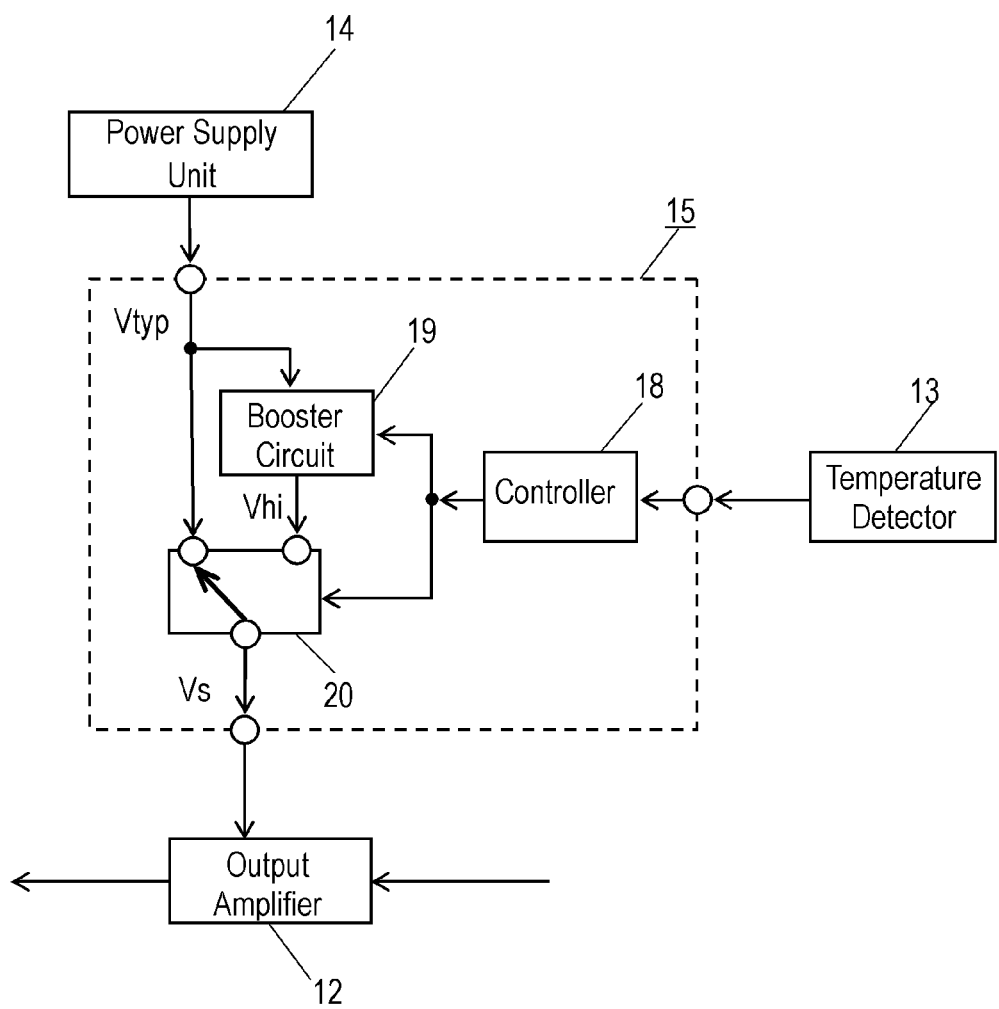
FIG. 1B is a block diagram of a power supply voltage controller of the physical quantity detection apparatus according to Embodiment 1.

FIG. 1B is a block diagram of power supply voltage controller 15. Power supply voltage controller 15 includes controller 18 configured to output a control signal based on the temperature detected by temperature detector 13, booster circuit 19 to which the control signal from controller 18 and power supply voltage Vtyp from power supply unit 14 are input, and switch 20 to which the control signal from controller 18, boosted voltage Vhi output from booster circuit 19, and power supply voltage Vtyp are input. Booster circuit 19 boosts power supply voltage Vtyp from power supply unit 14, and generates boosted voltage Vhi.

Switch 20 selectively outputs, as power supply voltage Vs, one of input power supply voltage Vtyp and boosted voltage Vhi in response to the control signal from controller 18.

Figure 2A:
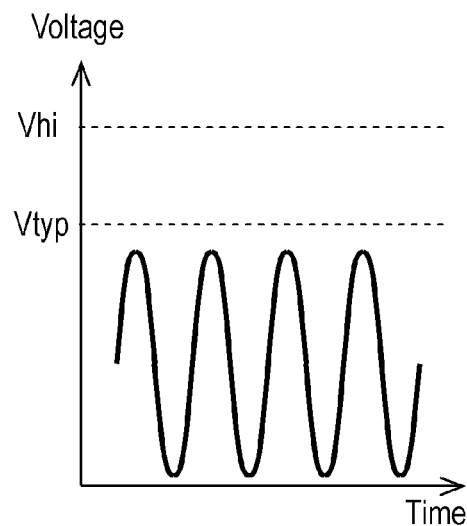
FIG. 2A is illustrates a drive voltage at a room temperature of the physical quantity detection apparatus according to Embodiment 1.
Figure 2B:
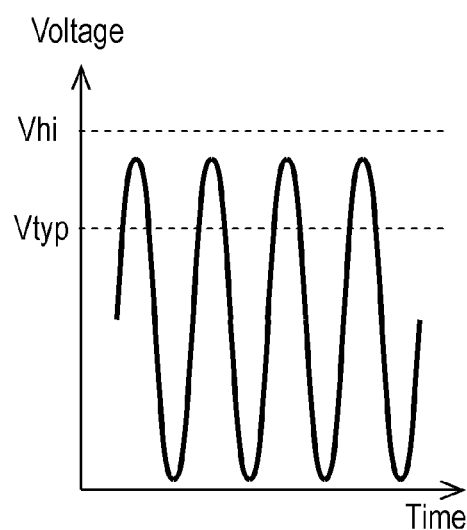
FIG. 2B illustrates a drive voltage at a high temperature of the physical quantity detection apparatus according to Embodiment 1.

FIG. 2A illustrates a voltage of a drive signal at drive terminal D2 of physical quantity detection apparatus 1 illustrated in FIG. 1A at a room temperature. FIG. 2B illustrates a voltage of a drive signal at drive terminal D2 at a high temperature. In FIG. 2A and FIG. 2B, the horizontal axis represents time, and the vertical axis represents the voltage of the drive signal.

As illustrated in FIG. 2A, at the room temperature, power supply voltage Vtyp supplied to output amplifier 12 is larger than the amplitude of the drive voltage. According to Embodiment 1, power supply voltage Vtyp is 3 V, and the amplitude of the drive voltage at the room temperature is 2.5 V. The voltage difference between power supply voltage Vtyp and the amplitude of the drive voltage can be determined to be a minimum value at which drive circuit 3 and output amplifier 12 avoid saturation of the drive voltage. According to Embodiment 1, an excessive margin is not provided in this voltage difference. As illustrated in FIG. 2B, at the high temperature, boosted voltage Vhi obtained by boosting power supply voltage Vtyp is supplied to output amplifier 12. Then, drive circuit 3 and output amplifier 12 can output the drive voltage without saturating the drive voltage. According to Embodiment 1, boosted voltage Vhi is 4.5 V, and the amplitude of the voltage of the drive signal at the high temperature is 4.0 V.

Figure 3:
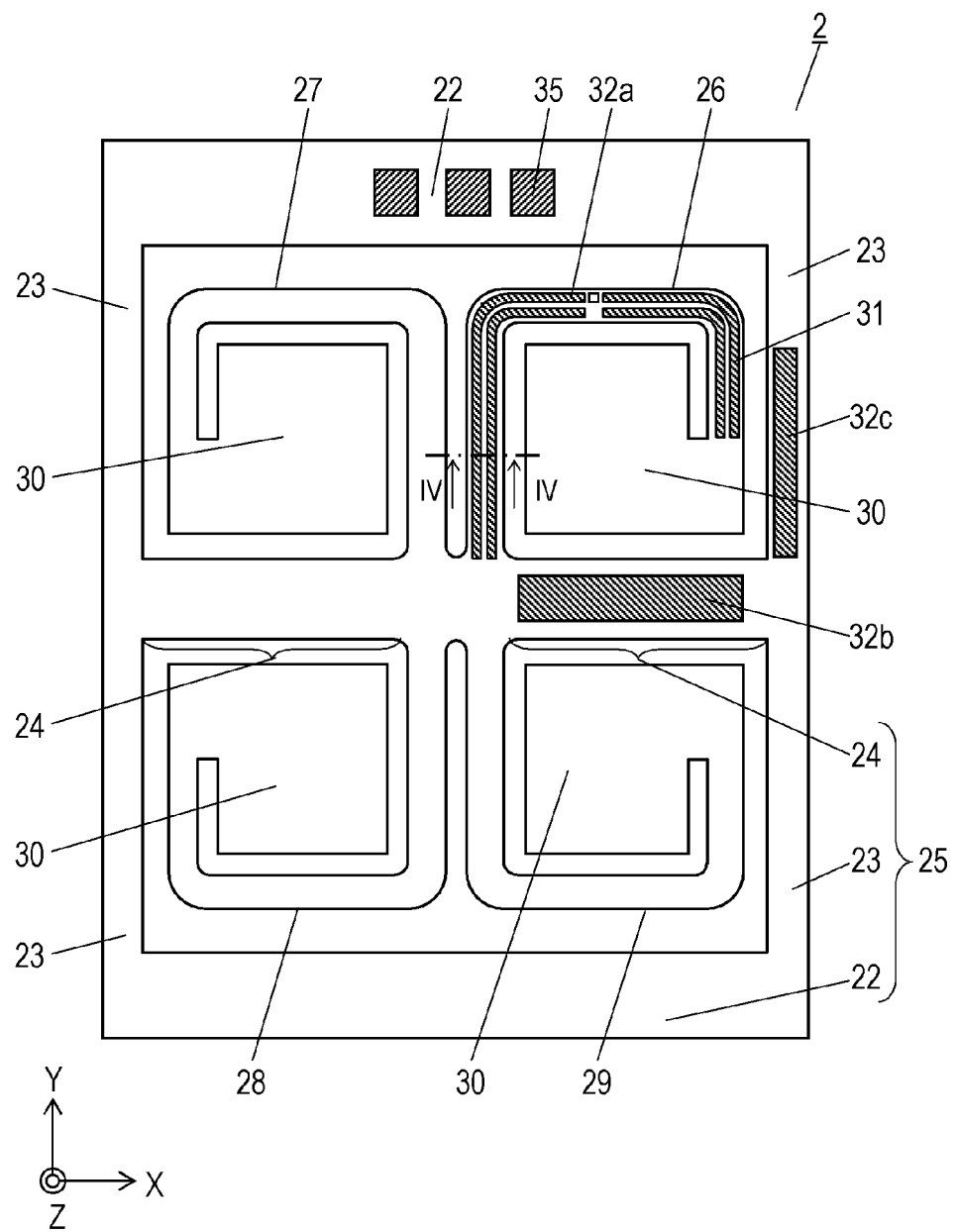
FIG. 3 is a top view of a vibrator of the physical quantity detection apparatus according to Embodiment 1.
Figure 4:
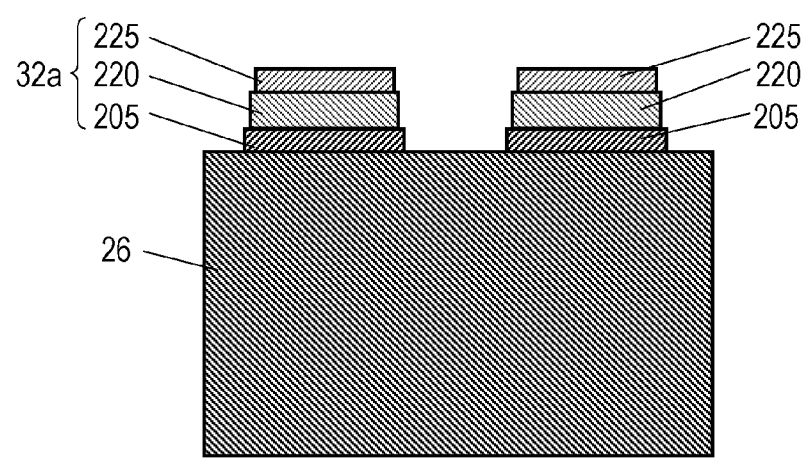
FIG. 4 is a sectional view of the vibrator on line IV-IV illustrated in FIG. 3.

FIG. 3 is a top view of vibrator 2. FIG. 4 is a sectional view of vibrator 2 on line IV-IV illustrated in FIG. 3. In FIG. 3, an X-axis, a Y-axis and a Z-axis perpendicular to each other are defined, and an XY plane including the X-axis and the Y-axis is further defined.

Vibrator 2 includes base 25, arms 26 to 29 each having an end supported by base 25, plummets 30 each connected to respective one of arms 26 to 29, drive unit 31 configured to drive and vibrate arms 26 to 29 in parallel to the XY plane, detector 32a provided on arm 26, detectors 32b and 32c provided on base 25, electrodes 35 electrically connected via wires led out from drive unit 31 and detectors 32a, 32b and 32c. Detector 32a is located on arm 26 and near base 25, and detects inertial force generated by an angular velocity about the Z-axis. Detector 32b detects inertial force generated by an angular velocity about the Y-axis. Detector 32c detects inertial force generated by an angular velocity about the X-axis. Base 25, arms 26 to 29, and plummets 30 are made of silicon (Si). Base 25 includes a pair of supporters 22, a pair of longitudinal beams 23 each having both ends connected to the pair of supporters 22, and lateral beams 24 each having both ends connected to respective substantial centers of the pair of longitudinal beams 23. Supporters 22 have electrodes 35 thereon for connection to an external substrate. Arms 26 to 29 are connected to lateral beams 24 of base 25. Vibrator 2 is mounted in an inside of a package maintained at atmospheric pressure.

Detector 32a includes lower electrode 205 provided on arm 26, piezoelectric thin film 220 provided on lower electrode 205, and upper electrode 225 provided on piezoelectric thin film 220. Similarly, each of other detectors 32b and 32c, and drive unit 31 includes a lower electrode provided on the arm, a piezoelectric thin film provided on the lower electrode, and an upper electrode provided on the piezoelectric thin film.

Figure 5A:
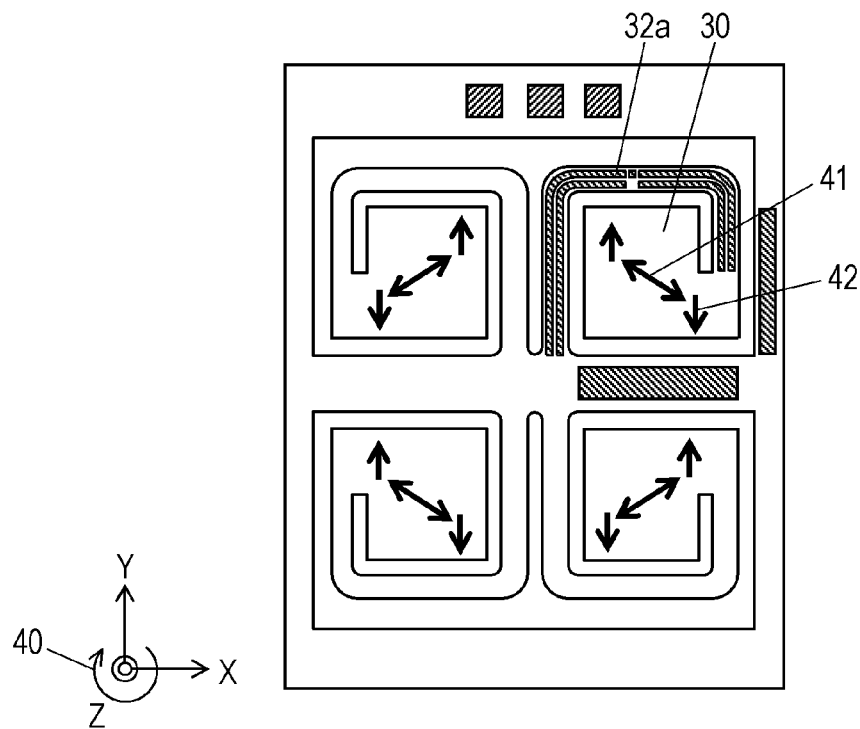
FIG. 5A is a schematic view of the vibrator illustrated in FIG. 3 for illustrating an operation for detecting an angular velocity about a Z-axis.
Figure 5B:
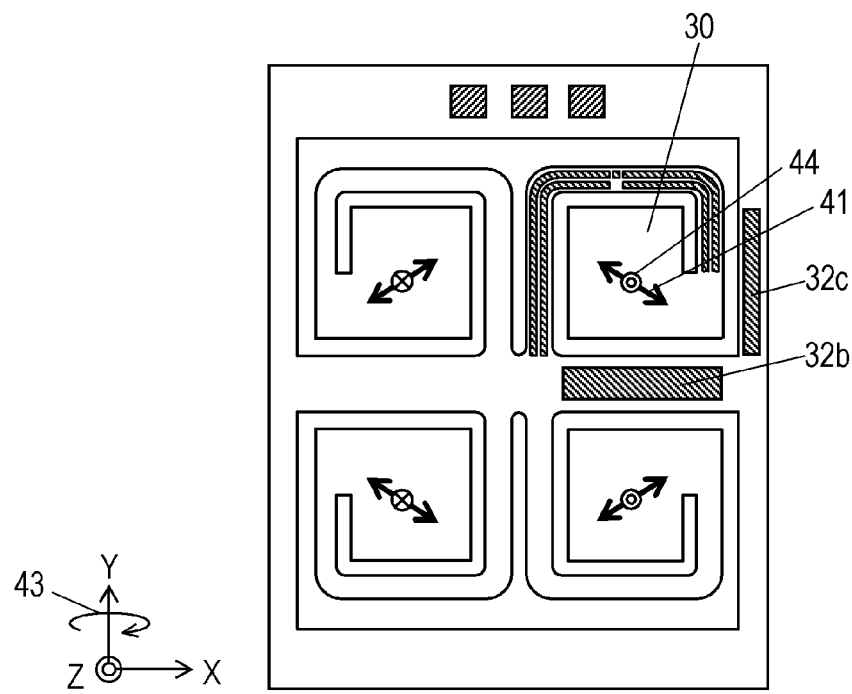
FIG. 5B is a schematic view of the vibrator illustrated in FIG. 3 for illustrating an operation for detecting an angular velocity about a Y-axis.

FIG. 5A illustrates an operation of vibrator 2 for detecting angular velocity 40 about the Z-axis. FIG. 5B illustrates an operation of vibrator 2 for detecting angular velocity 43 about the Y-axis.

As illustrated in FIG. 5A, a drive signal is supplied to drive unit 31 from drive circuit 3, such that each plummet 30 produces drive vibration 41 in the XY plane. When angular velocity 40 about the Z-axis is applied to physical quantity detection apparatus 1, inertial force (Coriolis force) is produced in a direction of the Y-axis, and provides each plummet 30 with detection vibration 42. A detection signal output from detector 32a due to detection vibration 42 has the same frequency as of the drive vibration, and has amplitude depending on magnitude of angular velocity 40. Therefore, the amplitude of this detection signal is measured to detect the magnitude of angular velocity 40.

As illustrated in FIG. 5B, when angular velocity 43 about the Y-axis is input, detection vibration 44 in a direction of the Z-axis is generated in each plummet 30 by inertial force. A detection signal output from detector 32b due to detection vibration 44 has the same frequency as drive vibration 41, and has amplitude depending on magnitude of angular velocity 43. Therefore, amplitude of this detection signal is measured to detect the magnitude of angular velocity 43. Physical quantity detection apparatus 1 can also detect an angular velocity about the X-axis similarly to the angular velocity about the Y-axis.

Figure 6:
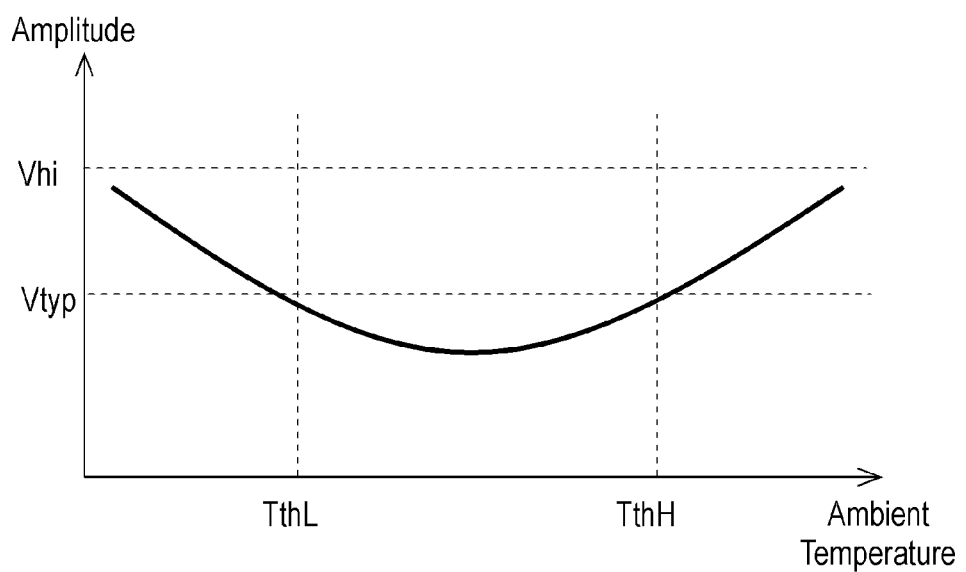
FIG. 6 illustrates a change, due to a temperature, of a drive voltage output from a drive circuit of the physical quantity detection apparatus according to Embodiment 1.
Figure 7A:
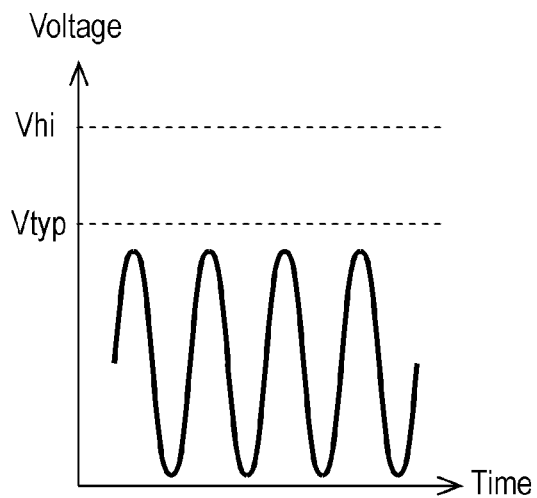
FIG. 7A illustrates a drive voltage output from the drive circuit of the physical quantity detection apparatus according to Embodiment 1.
Figure 7B:
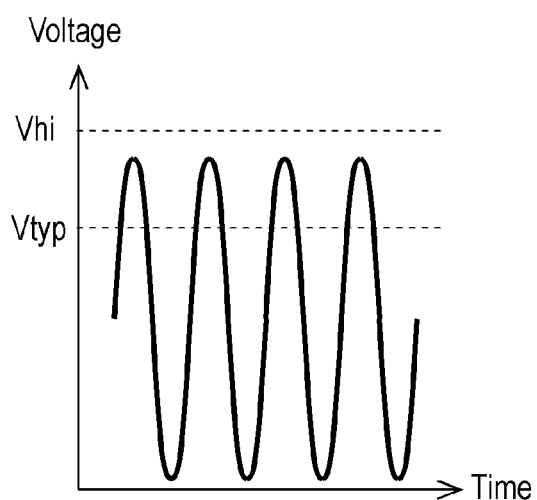
FIG. 7B illustrates a drive voltage output from the drive circuit of the physical quantity detection apparatus according to Embodiment 1.

FIG. 6 illustrates a change, due to a temperature, of amplitude of a voltage of a drive signal output from drive circuit 3. FIG. 7A illustrates amplitude of a voltage of a drive signal output from drive circuit 3 at a room temperature, and FIG. 7B illustrates amplitude of a voltage of a drive signal at a high temperature and a low temperature.

Vibrator 2 hardly vibrates mechanically at the high temperature and at the low temperature. That is, in order to make mechanical amplitude of vibrator 2 constant regardless of the temperature, the amplitude of the voltage of the drive vibration at each of the high temperature and the low temperature is larger than the amplitude of the voltage of the drive vibration at the room temperature. Therefore, in driver apparatus 91 including vibrator 2, power supply voltage controller 15 preferably outputs boosted voltage Vhi obtained by boosting power supply voltage Vtyp to output amplifier 12 as power supply voltage Vs when the temperature obtained by temperature detector 13 is higher than predetermined high-temperature-side threshold TthH, or is lower than predetermined low-temperature-side threshold TthL. Furthermore, power supply voltage controller 15 preferably outputs power supply voltage Vtyp to output amplifier 12 as power supply voltage Vs when the temperature obtained by temperature detector 13 is not higher than predetermined high-temperature-side threshold TthH and is not lower than predetermined low-temperature-side threshold TthL. According to Embodiment 1, predetermined high-temperature-side threshold TthH is 70° C., and predetermined low-temperature-side threshold TthL is −10° C.

Figure 8:
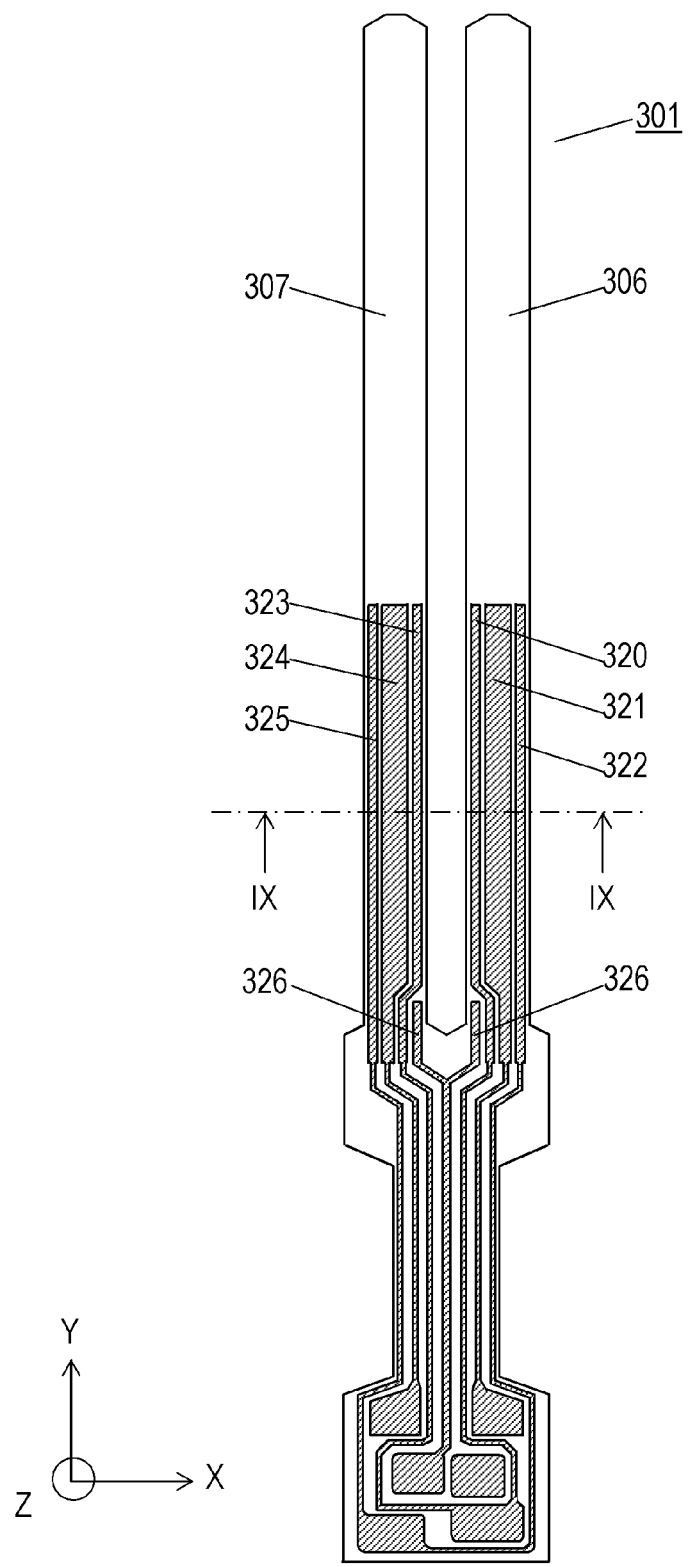
FIG. 8 is a top view of another vibrator of the physical quantity detection apparatus according to Embodiment 1.
Figure 9:
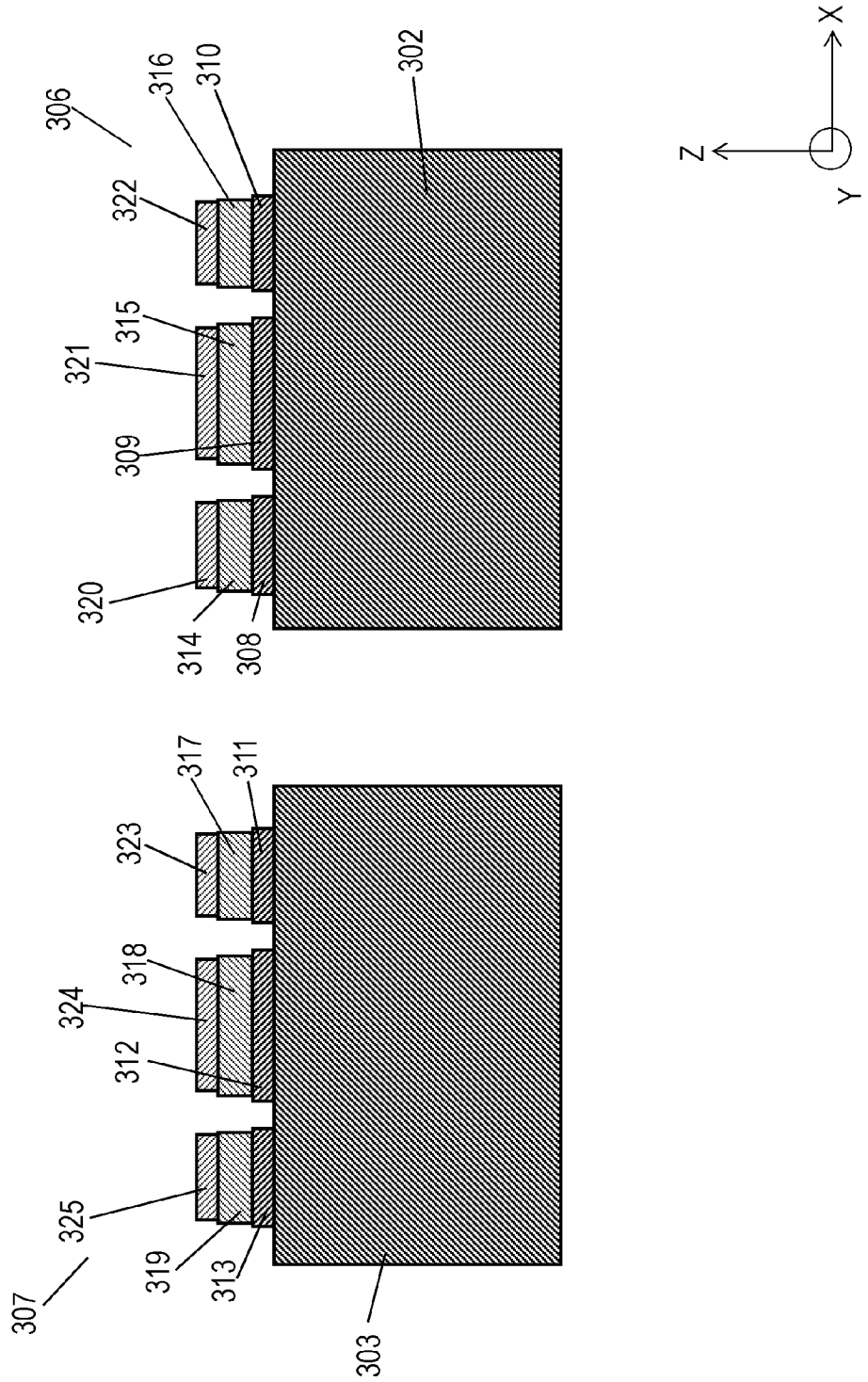
FIG. 9 is a sectional view of the vibrator illustrated on line IX-IX illustrated in FIG. 8.

FIG. 8 is a top view of another vibrator 301 of physical quantity detection apparatus 1 according to Embodiment 1. FIG. 9 is a sectional view of vibrator 301 on line IX-IX illustrated in FIG. 8.

As illustrated in FIG. 9, vibrator 301 includes tuning-fork type silicon substrates 302 and 303, lower electrodes 308, 309 and 310 provided on silicon substrate 302, lower electrodes 311, 312 and 313 provided on silicon substrate 303, piezoelectric thin films 314, 315, 316, 317, 318 and 319 provided on lower electrodes 308, 309 310, 311, 312 and 313, respectively, and upper electrodes 320, 321, 322, 323, 324 and 325 provided on piezoelectric thin films 314, 315, 316, 317, 318 and 319, respectively. Upper electrodes 320, 322, 323 and 325 constitute drive electrodes. Upper electrodes 321 and 324 constitute detection electrodes. Lower electrodes 308, 309, 310, 311, 312 and 313 are connected to a reference potential.

A voltage of a predetermined drive signal is applied to each of drive electrodes 320, 322, 323 and 325 to cause arms 306 and 307 of vibrator 301 to vibrate in a direction of an X-axis. When the angular velocity about a Y-axis is applied while arms 306 and 307 of vibrator 301 vibrate in the direction of the X-axis, Coriolis force generates in arms 306 and 307. Arms 306 and 307 then warp in a direction of a Z-axis due to the Coriolis force, and piezoelectric thin films 315 and 318 warp similarly, such that charges are generated in detection electrodes 321 and 324. The amount of the charges is proportional to the Coriolis force, and therefore, the charges are detected to detect the angular velocity.

Vibrator 301 is mounted in the inside of a package maintained at the atmospheric pressure.

Figure 10:
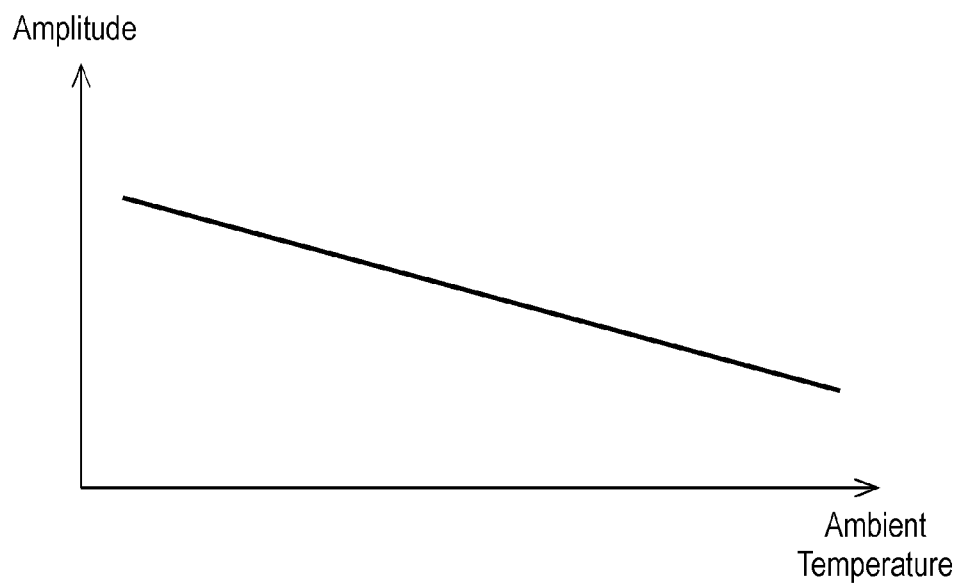
FIG. 10 illustrates a change, due to a temperature, of amplitude of a drive voltage of the physical quantity detection apparatus according to Embodiment 1 including the vibrator illustrated in FIG. 8.

FIG. 10 illustrates a change, due to a temperature, of amplitude of a voltage of a drive voltage output from drive circuit 3 of physical quantity detection apparatus 1 including vibrator 301 instead of vibrator 2. In FIG. 10, the vertical axis represents the amplitude of the voltage of the drive signal, and the horizontal axis represents an ambient temperature of vibrator 301. Vibrator 301 hardly vibrates mechanically at the low temperature lower than the room temperature compared to the room temperature. Therefore, power supply voltage controller 15 preferably outputs boosted voltage Vhi obtained by boosting power supply voltage Vtyp when the temperature obtained by temperature detector 13 is the low temperature.

Figure 11:
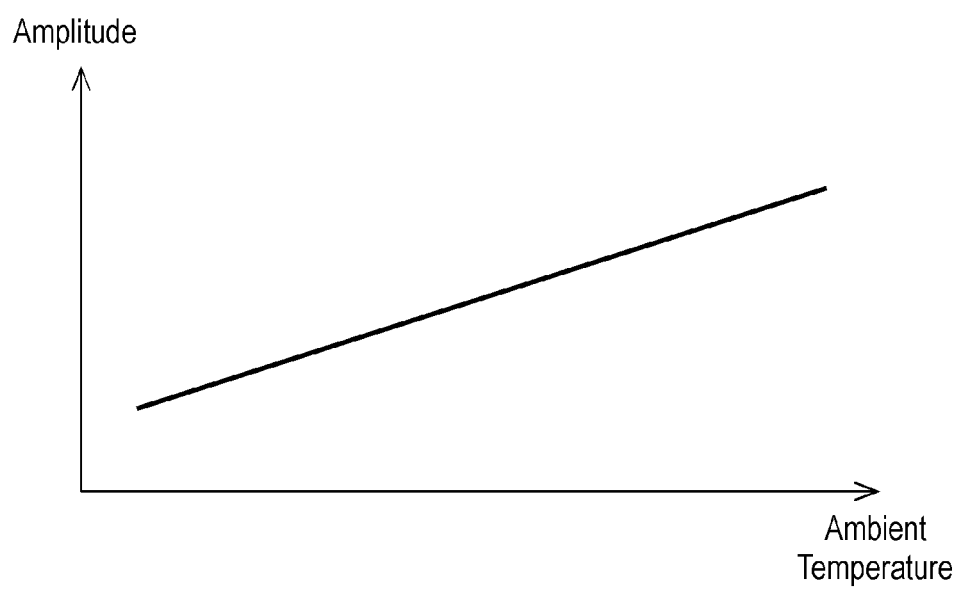
FIG. 11 illustrates a change, due to a temperature, of amplitude of a drive voltage of the physical quantity detection apparatus according to Embodiment 1 including the vibrator illustrated in FIG. 8.

FIG. 11 illustrates a change, due to a temperature, of amplitude of a voltage of a drive signal output from drive circuit 3 of physical quantity detection apparatus 1 including vibrator 301. In FIG. 11, the vertical axis represents the amplitude of the voltage of the drive signal, and the horizontal axis represents the ambient temperature around vibrator 301. Vibrator 301 is mounted in the inside of the package maintained in a vacuum. In this case, vibrator 301 hardly vibrates mechanically at a temperature higher than the room temperature compared to a case of the room temperature. Therefore, power supply voltage controller 15 preferably outputs boosted voltage Vhi obtained by boosting power supply voltage Vtyp when the temperature obtained by temperature detector 13 is the high temperature.

As described above, in each of vibrators 2 and 301, difficulty of mechanical vibration relative to a temperature differs depending on a difference in a structure of the vibrator, a difference in surrounding atmospheric pressure, or a difference in a constituent material. The difference between the structures of vibrators 2 and 301 is, for example, a difference in a size of a space between the arm that mechanically vibrates and the base around the arm, or a size of a space between the adjacent two arms. Therefore, driver apparatus 91 according to Embodiment 1 supplies, to output amplifier 12, boosted voltage Vhi obtained by boosting power supply voltage Vtyp when the temperature obtained by temperature detector 13 is the high temperature or the low temperature, such that the amplitude of the voltage of the drive signal from the output amplifier 12 can be increased.

Consequently, even in the case where mechanical amplitude of each of vibrators 2 and 301 changes due the temperature, a margin of the amplitude of the voltage of the drive vibration can be reduced. Then, physical quantity detection apparatus 1 including driver apparatus 91 can increase the amplitude of the voltage of the drive signal at the room temperature, and displacement of vibrator 2 can be increased. Therefore, it is possible to increase detection sensitivity.

Physical quantity detection apparatus 1 according to Embodiment 1 can employ a small vibrator having a microscopic structure, as vibrator 2, and has high detection sensitivity in a wide temperature range. Additionally, vibrator 2 can be mounted in the atmospheric pressure, and therefore, a package which mounts the vibrator can be small at a low cost. Thus, physical quantity detection apparatus 1 having high sensitivity in a wide temperature range can be provided even when the physical quantity detection apparatus has a simple sealing structure. Additionally, a similar effect is obtained even when a material configuring vibrator 2 is different. Therefore, for example, even when the material configuring vibrator 2 is changed from general piezoelectric ceramics, such as PZT, to a lead-free piezoelectric material having a low environmental load, such as sodium potassium niobate and bismuth ferrite, thus providing physical quantity detection apparatus 1 having high sensitivity in a wide temperature range.

In power supply voltage controller 15 illustrated in FIG. 1B, when switch 20 supplies power supply voltage Vtyp to output amplifier 12, as power supply voltage Vs, boosted voltage Vhi is unnecessary. Therefore, when power supply voltage controller 15 supplies power supply voltage Vtyp to output amplifier 12, as power supply voltage Vs, controller 18 preferably reduces power to be supplied to booster circuit 19, or stops supplying the power not to operate booster circuit 19. That is, booster circuit 19 operates when the temperature detected by temperature detector 13 is the high temperature or the low temperature, and does not operate when the temperature is the room temperature, thus providing physical quantity detection apparatus 1 with small power consumption.

Exemplary Embodiment 2

Figure 12:
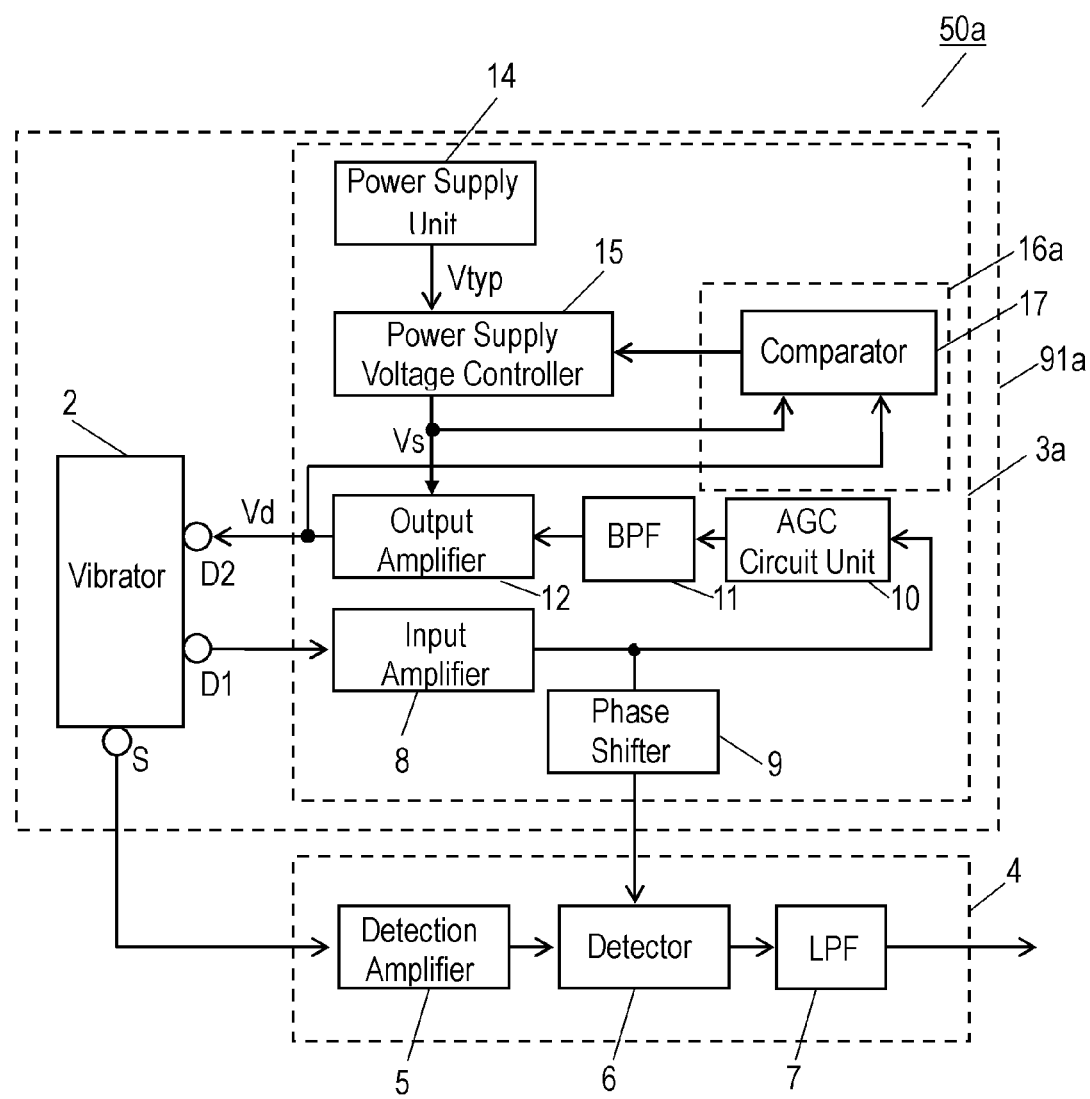
FIG. 12 is a block diagram of a physical quantity detection apparatus according to Exemplary Embodiment 2.

FIG. 12 is a block diagram of physical quantity detection apparatus 50a according to Exemplary Embodiment 2. In FIG. 12, components identical to those of physical quantity detection apparatus 1 according to Embodiment 1 illustrated in FIG. 1A are denoted by the same reference numerals. Physical quantity detection apparatus 50a includes driver apparatus 91a including drive circuit 3a instead of driver apparatus 91 including drive circuit 3 of physical quantity detection apparatus 1 according to Embodiment 1 illustrated in FIG. 1A.

Drive circuit 3a illustrated in FIG. 12 includes amplitude detector 16a configured to detect amplitude Vd of a drive signal instead of temperature detector 13 of drive circuit 3 according to Embodiment 1 illustrated in FIG. 1A. Power supply voltage controller 15 controls power supply voltage Vs supplied to output amplifier 12 based on at least amplitude Vd of the drive signal detected by amplitude detector 16a.

Amplitude detector 16a includes comparator 17 that compares amplitude Vd of a voltage of the drive signal with power supply voltage Vs.

Comparator 17 compares amplitude Vd of the drive signal with power supply voltage Vs, and outputs the comparison result to power supply voltage controller 15. According to Embodiment 2, this comparison result is a difference (Vs−Vd) between amplitude Vd of the drive signal and power supply voltage Vs.

Power supply voltage controller 15 supplies, to output amplifier 12, power supply voltage Vs in accordance with difference (Vs−Vd) that is the comparison result output from comparator 17. Power supply voltage Vs is power supply voltage Vtyp output from power supply unit 14 or boosted voltage Vhi obtained by boosting power supply voltage Vtyp by 1.5 times. According to Embodiment 2, power supply voltage Vtyp is, for example, 3 V, and boosted voltage Vhi is, for example, 4.5 V.

Figure 13:
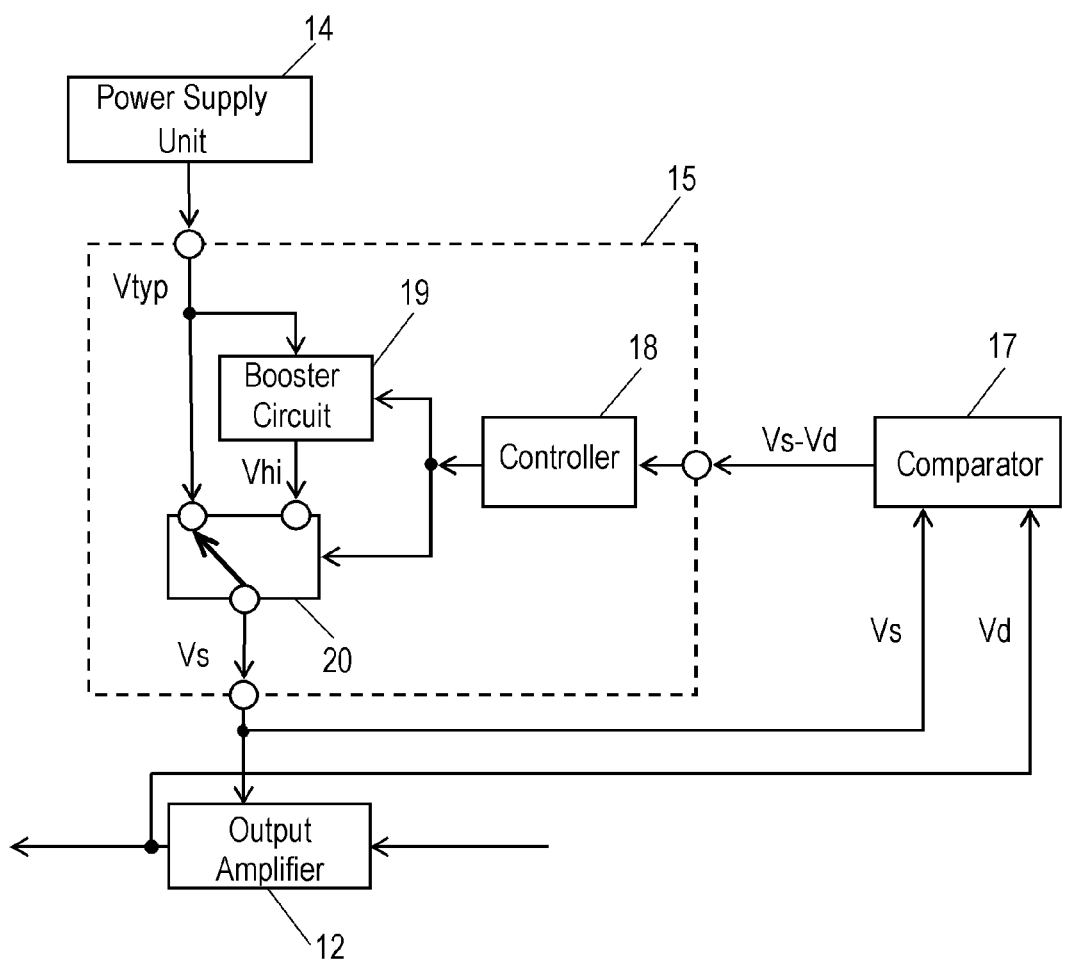
FIG. 13 is a block diagram of a power supply voltage controller of the physical quantity detection apparatus according to Embodiment 2.

FIG. 13 is a block diagram of power supply voltage controller 15. Power supply voltage controller 15 includes controller 18 that receives the comparison result output from comparator 17 to output a control signal, booster circuit 19 to which the control signal from controller 18 and power supply voltage Vtyp from power supply unit 14 are input, and switch 20 to which the control signal from controller 18, boosted voltage Vhi output from booster circuit 19, and power supply voltage Vtyp are input. Booster circuit 19 boosts power supply voltage Vtyp from power supply unit 14, and generates boosted voltage Vhi.

Switch 20 selectively outputs one of input power supply voltage Vtyp and boosted voltage Vhi as power supply voltage Vs in accordance with the control signal from controller 18.

An operation of power supply voltage controller 15 based on difference (Vs−Vd) that is the comparison result input to power supply voltage controller 15 will be described below. According to Embodiment 2, power supply voltage Vtyp is 3 V, and boosted voltage Vhi is 4.5 V.

(i) An Operation when Power Supply Voltage Vs is Power Supply Voltage Vtyp (3 V)

When difference (Vs−Vd) that is the comparison result is larger than a first threshold while power supply voltage Vs is power supply voltage Vtyp (3 V), controller 18 controls switch 20 so as to keep power supply voltage Vs at power supply voltage Vtyp. On the other hand, when difference (Vs−Vd) that is the comparison result is not larger than the first threshold while power supply voltage Vs is power supply voltage Vtyp (3 V), controller 18 controls switch 20 to switch power supply voltage Vs to boosted voltage Vhi.

The first threshold is determined based on an output dynamic range of output amplifier 12 to avoid saturation of amplitude Vd of the drive signal, and is 0.7 V according to Embodiment 2.

(ii) An Operation when Power Supply Voltage Vs is Boosted Voltage Vhi

When difference (Vs−Vd) that is the comparison result is larger than a second threshold while power supply voltage Vs is boosted voltage Vhi, controller 18 controls switch 20 to switch power supply voltage Vs to power supply voltage Vtyp. On the other hand, when difference (Vs−Vd) that is the comparison result is not larger than the second threshold while power supply voltage Vs is boosted voltage Vhi, controller 18 controls switch 20 so as to keep power supply voltage Vs at boosted voltage Vhi.

The second threshold is determined based on a voltage obtained by the sum of an output dynamic range of output amplifier 12 and the voltage difference between power supply voltage Vtyp and boosted voltage Vhi, and is 1.7 V according to Embodiment 2. The second threshold is larger than the first threshold.

With such a configuration, physical quantity detection apparatus 50a according to Embodiment 2 controls power supply voltage Vs supplied to output amplifier 12 by directly detecting amplitude Vd of the drive signal output from output amplifier 12, such that this drive signal is not saturated in output amplifier 12. Therefore, even in a case where a characteristic of BPF 11 of drive circuit 3 and the gain of output amplifier 12 vary, physical quantity detection apparatus 50a has high sensitivity in a wide temperature range.

Figure 14:
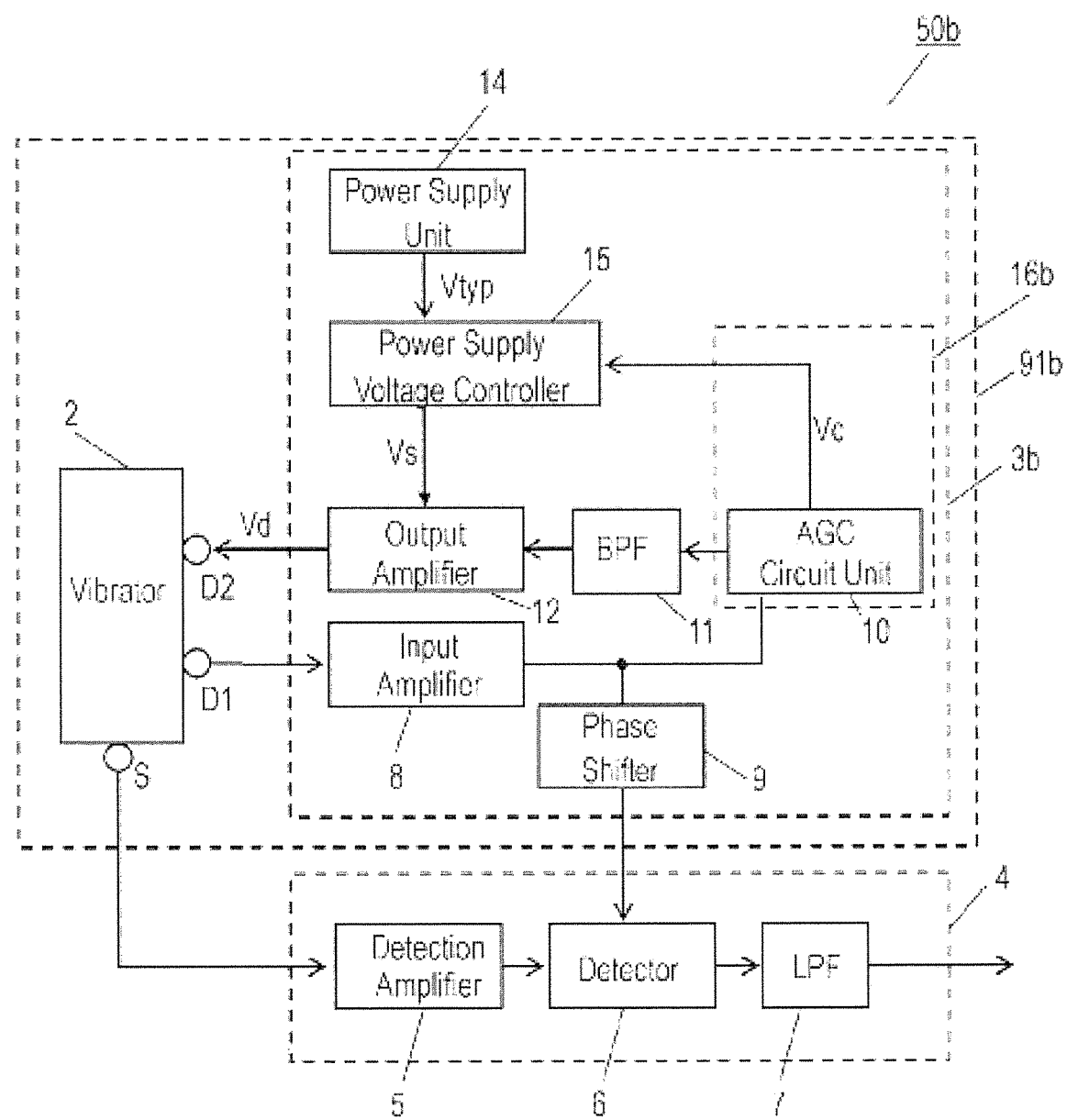
FIG. 14 is a block diagram of another drive circuit of the physical quantity detection apparatus according to Embodiment 2.

FIG. 14 is a block diagram of another physical quantity detection apparatus 50b according to Embodiment 2. In FIG. 14, components identical to those of physical quantity detection apparatus 50a illustrated in FIG. 12 are denoted by the same reference numerals. Physical quantity detection apparatus 50b includes driver apparatus 91b including drive circuit 3b instead of driver apparatus 91a including drive circuit 3a of physical quantity detection apparatus 50a illustrated in FIG. 12. Drive circuit 3b includes amplitude detector 16b instead of amplitude detector 16a of drive circuit 3a illustrated in FIG. 12. In driver apparatus 91b, power supply voltage controller 15 controls power supply voltage Vs based on amplitude of a monitor signal detected by AGC circuit unit 10.

An output signal (monitor signal) of input amplifier 8 is input to AGC circuit unit 10, and AGC voltage Vc in accordance with the gain of a variable gain amplifier of AGC circuit unit 10 is output based on magnitude of the monitor signal. Amplitude detector 16b illustrated in FIG. 14 outputs, to power supply voltage controller 15, AGC voltage Vc output from AGC circuit unit 10.

Figure 15:
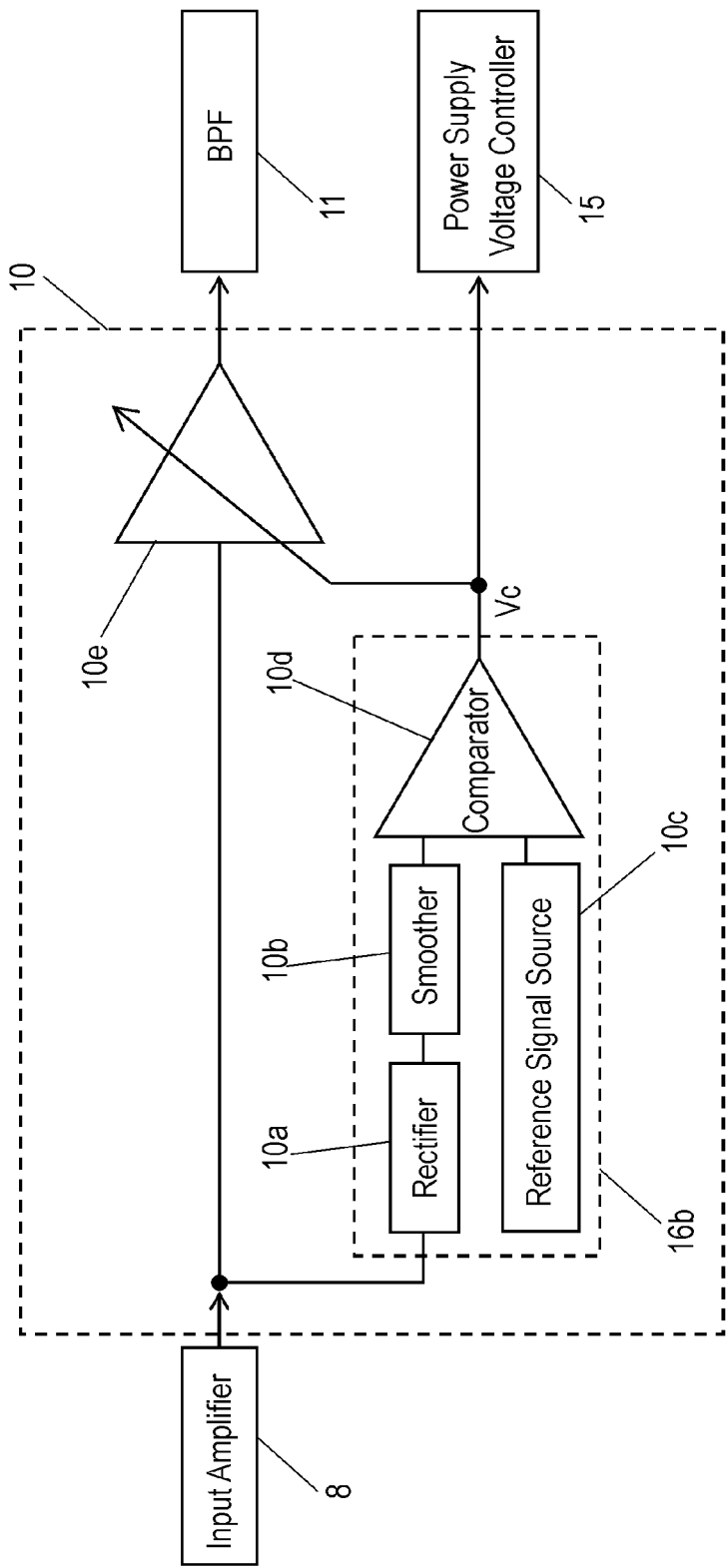
FIG. 15 is a block diagram of an AGC circuit unit of the physical quantity detection apparatus according to Embodiment 2.

FIG. 15 is a block diagram of AGC circuit unit 10. AGC circuit unit 10 includes rectifier 10a, smoother 10b, reference signal source 10c, comparator 10d, and variable gain amplifier 10e. Rectifier 10a outputs a signal obtained by rectifying the monitor signal from input amplifier 8, and smoother 10b outputs a direct-current (DC) voltage obtained by smoothing an output signal of rectifier 10a. Comparator 10d compares this DC voltage with a predetermined reference voltage output from reference signal source 10c, and outputs AGC voltage Vc. Variable gain amplifier 10e outputs, to output amplifier 12, a signal obtained by amplifying the monitor signal from input amplifier 8 via BPF 11. The gain of variable gain amplifier 10e is controlled based on AGC voltage Vc. AGC voltage Vc detects an extremely small change of the monitor signal input to AGC circuit unit 10, and largely changes the gain of variable gain amplifier 10e. Consequently, even when temperature fluctuation is generated, and vibrator 2 hardly vibrates mechanically, drive circuit 3 is controlled such that amplitude Vd of the voltage of the drive signal is increased while amplitude of the monitor signal is substantially constant. As a result, amplitude of the mechanical vibration of vibrator 2 is controlled to be constant.

As described above, AGC voltage Vc is based on the voltage of the monitor signal, and power supply voltage controller 15 acquires AGC voltage Vc based on the voltage of the monitor signal, such that the amplitude of the voltage of the drive signal can be detected. That is, amplitude detector 16b detects the amplitude of the monitor signal, and power supply voltage controller 15 controls power supply voltage Vs based on the detected amplitude.

With such a configuration, physical quantity detection apparatus 50b includes AGC circuit unit 10 as amplitude detector 16b that detects amplitude Vd of the drive signal. Therefore, amplitude Vd of the voltage of the drive signal output from output amplifier 12 can be indirectly detected with a small-scaled circuit and a simple configuration. Thus, power supply voltage Vs of output amplifier 12 can be controlled such that the drive signal is not saturated due to power supply voltage Vtyp supplied to output amplifier 12.

In power supply voltage controller 15 illustrated in FIG. 1B, when switch 20 supplies power supply voltage Vtyp to output amplifier 12, as power supply voltage Vs, boosted voltage Vhi is unnecessary. Therefore, when power supply voltage controller 15 supplies power supply voltage Vtyp to output amplifier 12, as power supply voltage Vs, controller 18 preferably causes booster circuit 19 not to operate, thereby providing physical quantity detection apparatuses 50a and 50b with small power consumption.

Exemplary Embodiment 3

Figure 16:
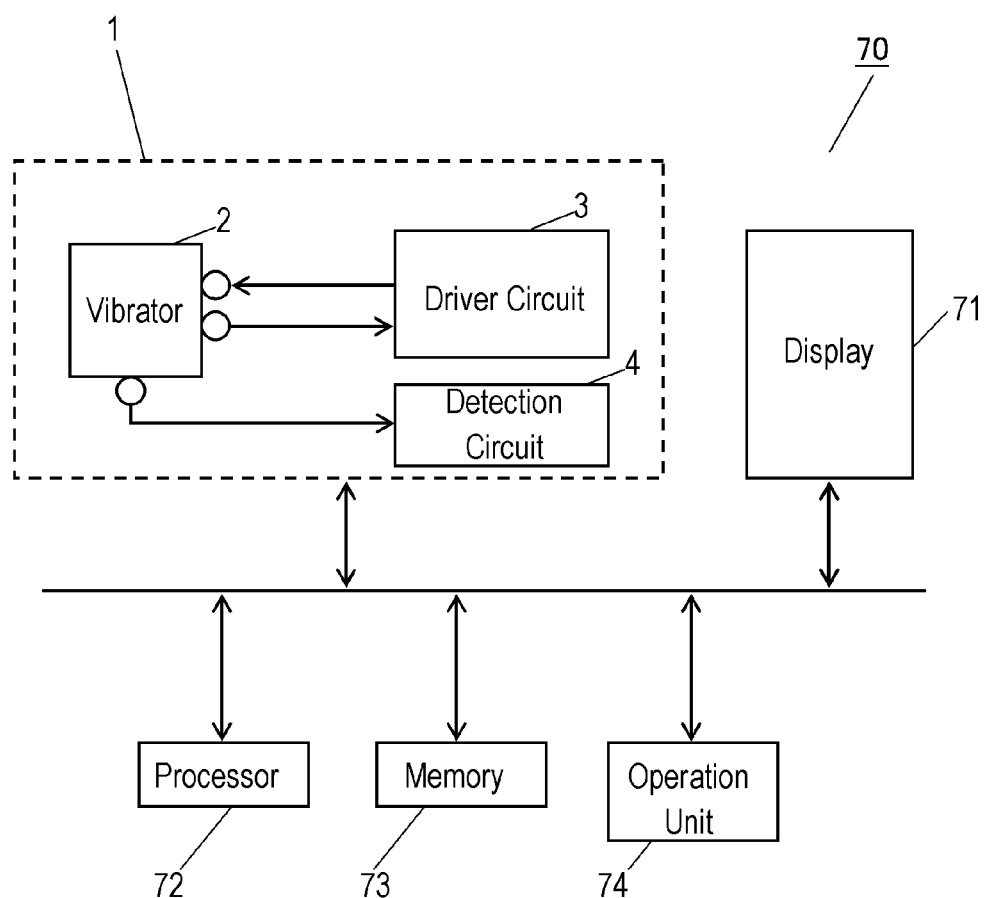
FIG. 16 is a schematic view of an electronic apparatus according to Exemplary Embodiment 3.

FIG. 16 is a schematic view of electronic apparatus 70 according to Exemplary Embodiment 3. Electronic apparatus 70 includes physical quantity detection apparatus 1 according to Embodiment 1, display 71, processor 72, such as a CPU, memory 73, and operation unit 74. Thus, electronic device 70 includes physical quantity detection apparatus 1, and circuits (such as display 71, processor 72 and memory 73) connected to physical quantity detection apparatus 1. Electronic apparatus 70 according to Embodiment 3 is a digital camera. Electronic apparatus 70 may include physical quantity detection apparatus 50a or physical quantity detection apparatus 50b according to Embodiment 2 instead of physical quantity detection apparatus 1.

Physical quantity detection apparatus 1 includes vibrator 2, drive circuit 3, and detection circuit 4 illustrated in FIG. 1A. Even in a case where a temperature changes, drive circuit 3 can output a drive signal of a voltage having a proper level while avoiding saturation of the drive voltage, and can improve a sensitivity characteristic and a temperature characteristic. Therefore, electronic apparatus 70 including physical quantity detection apparatus 1 can perform a process, such as a hand shake correction, accurately in a case where electronic apparatus 70 is, for example, a video camera or a digital still camera.

Thus, electronic device 70 has high performance. Electronic device 70 may be a car navigation system, an aircraft, or a robot, in addition to the digital camera.

While the present invention is described based on the exemplary embodiments in the above description, a person skilled in the art can easily understand that many modifications other than the above is possible. For example, the angular velocity sensor is described as an example of the physical quantity detection apparatus using the driver apparatus according to the present invention, but the present invention is not limited thereto. For example, it is possible to realize a vibration type acceleration sensor, a vibration type angular acceleration sensor, a vibration type strain sensor, a vibration type pressure sensor, a crystal vibrator, and the like using the driver apparatus of the present invention.

As a material configuring vibrator 2, for example, crystal, lithium niobate, or lead zirconate titanate can be used.

Exemplary Embodiment 4

Figure 17:
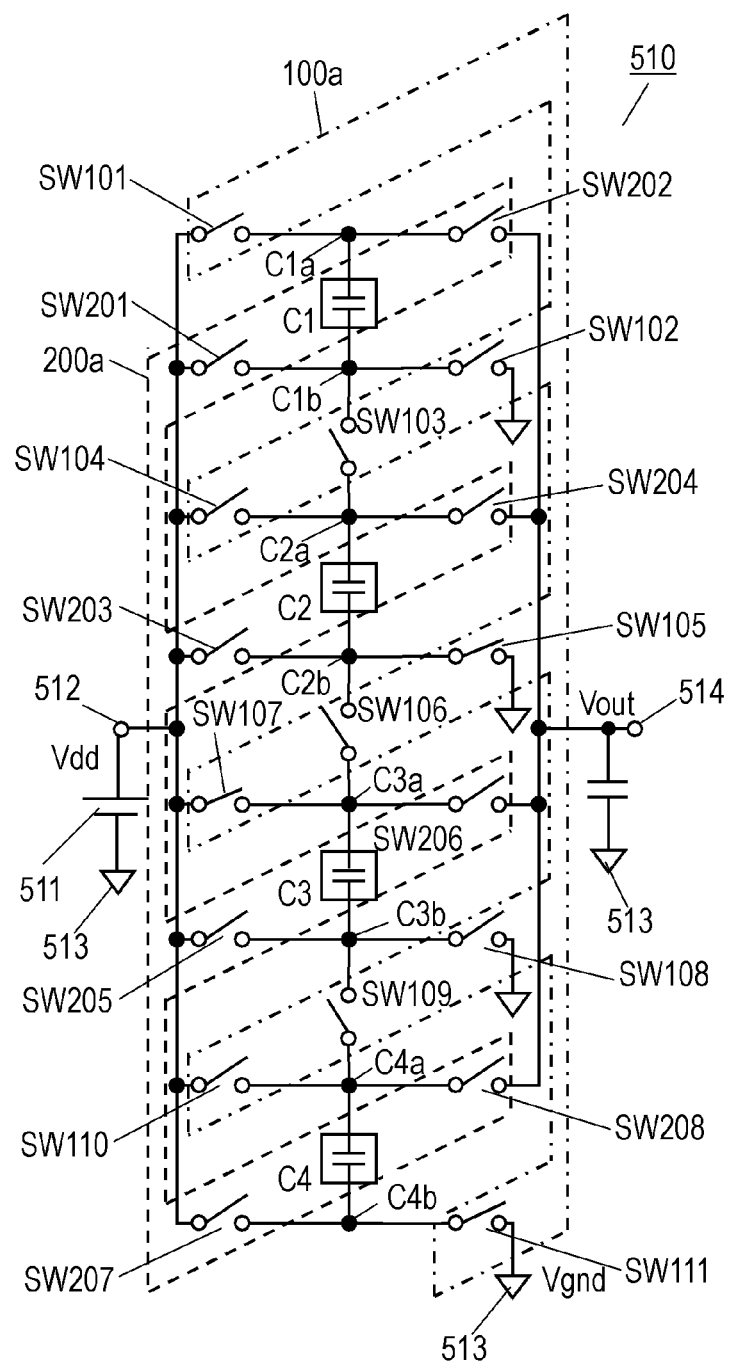
FIG. 17 is a circuit diagram of a booster circuit according to Exemplary Embodiment 4.

FIG. 17 is a circuit diagram of booster circuit 510 according to Exemplary Embodiment 4. Booster circuit 510 can be used as booster circuit 19 according to Embodiments 1 and 2 illustrated in FIGS. 1B and 13. Booster circuit 510 includes capacitors C1 to C4, input terminal 512 that supplies potential Vdd, common terminal 513 that supplies potential Vgnd, output terminal 514 that outputs voltage Vout obtained by boosting a voltage between potentials Vdd and Vgnd, and switches 100a and 200a. Switch 100a can switch between a series connection in which capacitors C1 to C4 are connected in series with each other between terminals 512 and 513 and a parallel connection in which capacitors C1 to C4 are connected in parallel with each other between terminals 512 and 513. Switch 200a can connect capacitors C1 to C4 in parallel with each other between terminals 512 and 514.

Voltage source 511 supplies potential Vdd to input terminal 512. According to Embodiment 4, potential Vdd is a power supply potential, and potential Vgnd is a ground potential, 0 V.

Capacitors C1 to C4 have the same capacitance. Capacitor C1 has ends C1a and C1b. Capacitor C2 has ends C2a and C2b. Capacitor C3 has ends C3a and C3b. Capacitor C4 has ends C4a and C4b.

Switch 100a includes switches SW101 to SW111. Switch SW101 is connected to input terminal 512 and end C1a of capacitor C1 in series between input terminal 512 and end C1a. Switch SW102 is connected to common terminal 513 and end C1b of capacitor C1 in series between common terminal 513 and end C1b. Switch SW103 is connected to end C1b of capacitor C1 and end C2a of capacitor C2 in series between end C1b and end C2a. Switch SW104 is connected to input terminal 512 and end C2a of capacitor C2 in series between input terminal 512 and end C2a. Switch SW105 is connected to common terminal 513 and end C2b of capacitor C2 in series between common terminal 513 and end C2b. Switch SW106 is connected to end C2b and end C3a of capacitor C3 in series between end C2b of capacitor C2 and end C3a. Switch SW107 is connected to input terminal 512 and end C3a of capacitor C3 in series between input terminal 512 and end C3a. Switch SW108 is connected to common terminal 513 and end C3b of capacitor C3 in series between common terminal 513 and end C3b. Switch SW109 is connected to end C3b and end C4a of capacitor C4 in series between end C3b of capacitor C3 and end C4a. Switch SW110 is connected to input terminal 512 and end C4a of capacitor C4 in series between input terminal 512 and end C4a. Switch SW111 is connected to common terminal 513 and end C4b of capacitor C4 in series between common terminal 513 and end C4b.

Switch 200a includes switches SW201 to SW208. Switch SW201 is connected to input terminal 512 and end C1b of capacitor C1 in series between input terminal 512 and end C1b. Switch SW202 is connected to terminal 514 and end C1a of capacitor C1 in series between output terminal 514 and end C1a. Switch SW203 is connected to input terminal 512 and end C2b of capacitor C2 in series between input terminal 512 and end C2b. Switch SW204 is connected to terminal 514 and end C2a of capacitor C2 in series between output terminal 514 and end C2a. Switch SW205 is connected to input terminal 512 and end C3b of capacitor C3 in series between input terminal 512 and end C3b. Switch SW206 is connected to terminal 514 and end C3a of capacitor C3 in series between output terminal 514 and end C3a. Switch SW207 is connected to input terminal 512 and end C4b of capacitor C4 in series between input terminal 512 and end C4b. Switch SW208 is connected to terminal 514 and end C4a of capacitor C4 in series between output terminal 514 and end C4a.

Connections of capacitors C1 to C4 controlled by switching switch 100a (switches SW101 to SW111) will be described below. When the connection of capacitors C1 to C4 is switched by switch 100a, switch 200a (switches SW201 to SW208) are turned off such that capacitors C1 to C4 are not connected to output terminal 514, thus being disconnected from output terminal 514.

When switches SW101, SW103, SW106, SW109 and SW111 of switch 100a are turned on, and switches SW102, SW104, SW105, SW107, SW108 and SW110 of switch 100a are turned off, capacitors C1 to C4 are connected to input terminal 512 (potential Vdd) and common terminal 513 (potential Vgnd) in series with each other between input terminal 512 and common terminal 513.

When switches SW101, SW103, SW105, SW107, SW109 and SW111 are turned on, and switches SW102, SW104, SW106, SW108 and SW110 are turned off, capacitors C1 and C2 are connected to input terminal 512 (potential Vdd) and common terminal 513 (potential Vgnd) in series with each other between input terminal 512 and common terminal 513, and capacitors C3 and C4 are connected to input terminal 512 (potential Vdd and common terminal 513 (potential Vgnd) in series with each other between input terminal 512) and common terminal 513 at the same time.

When switches SW101, SW102, SW104, SW105, SW107, SW108, SW110 and SW111 are turned on, and switches SW103, SW106 and SW109 are turned off, capacitors C1 to C4 are connected to input terminal 512 (potential Vdd) and common terminal 513 (potential Vgnd) in parallel with each other between input terminal 512 and common terminal 513.

Next, connections of capacitors C1 to C4 controlled by switching switch 200a (switches SW201 to SW208) will be described. When the connection of capacitors C1 to C4 is switched by switch 200a, switch 100a (switches SW101 to SW111) is turned off.

When switches SW201 to SW208 of switch 200a are turned on, capacitors C1 to C4 are connected in parallel with each other between input terminal 512 (potential Vdd) and output terminal 514.

An operation of booster circuit 510 will be described below. FIGS. 18A to 18D are circuit diagrams illustrating the operation of booster circuit 510.

Figure 18A:
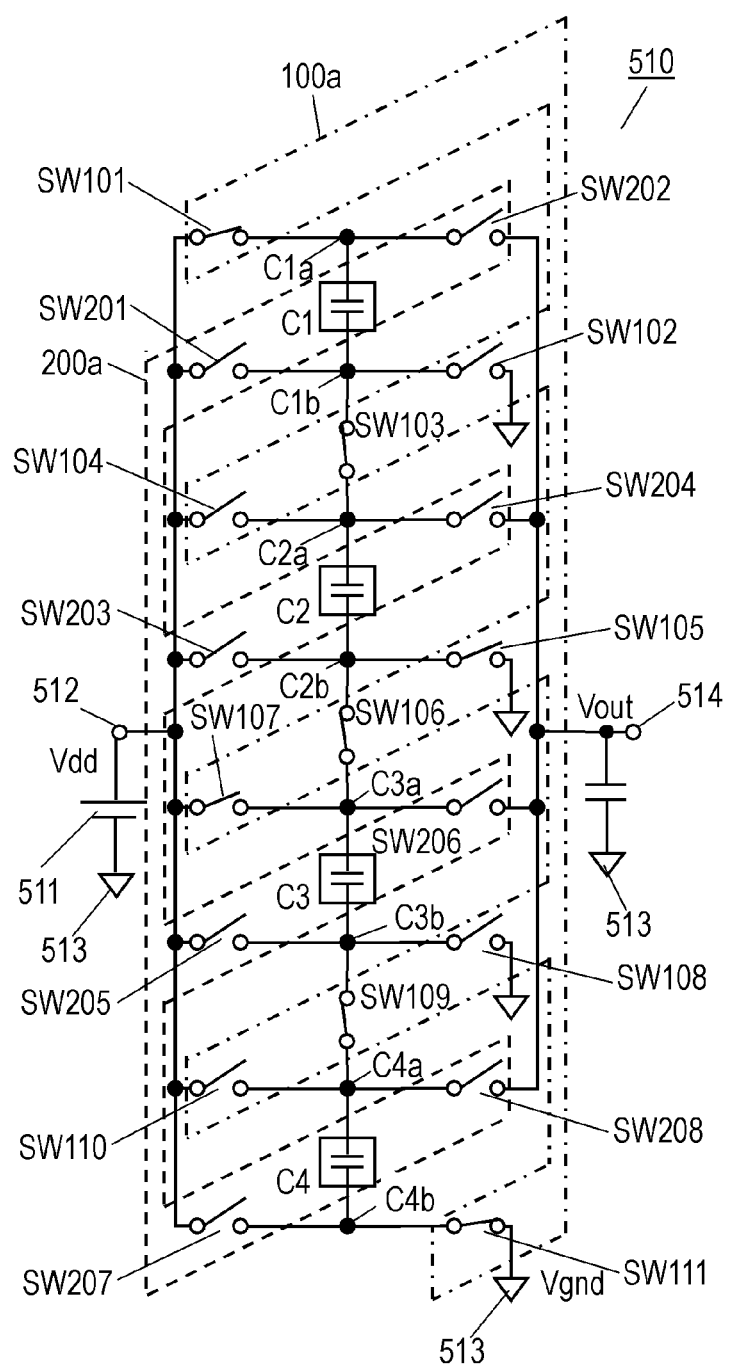
FIG. 18A is a circuit diagram of the booster circuit illustrated in FIG. 17 for illustrating an operation of the booster circuit.
Figure 18B:
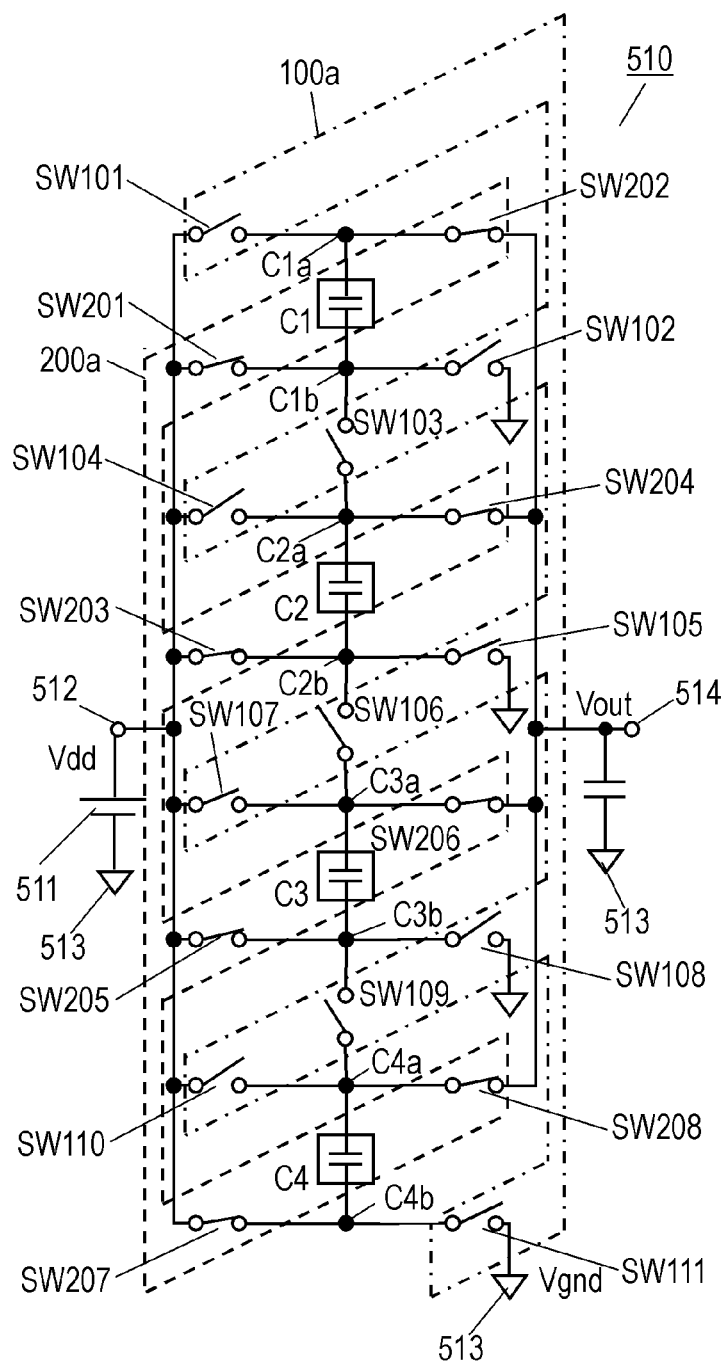
FIG. 18B is a circuit diagram of the booster circuit illustrated in FIG. 17 for illustrating an operation of the booster circuit.

In the operation illustrated in FIGS. 18A and 18B, booster circuit 510 outputs, from output terminal 514, boosted voltage Vout obtained by multiplying potential Vdd supplied to input terminal 512 by 1.25.

As illustrated in FIG. 18A, switches SW101, SW103, SW106, SW109 and SW111 of switch 100a are turned on, and the switches of switches 100a and 200a other than switches SW101, SW103, SW106, SW109 and SW111 of switch 100a are maintained being turned off, such that capacitors C1 to C4 are connected to input terminal 512 (potential Vdd) and common terminal 513 (potential Vgnd) in series with each other between input terminal 512 and common terminal 513. Consequently, each of capacitors C1 to C4 is charged at a voltage of 0.25×Vdd.

Then, as illustrated in FIG. 18B, all switches SW101 to SW111 of switch 100a are turned off, and switches SW201 to SW208 of switch 200a are turned on. Consequently, capacitors C1 to C4 each charged at a voltage of 0.25×Vdd are connected to input terminal 512 (potential Vdd) and output terminal 514 in parallel with each other between input terminal 512 and output terminal 514. Consequently, capacitors C1 to C4 are discharged such that the voltage of 0.25×Vdd of each of capacitors C1 to C4 is added to potential Vdd of input terminal 512, and voltage Vout of 1.25×Vdd (=Vdd+0.25×Vdd) is output from output terminal 514.

Figure 18C:
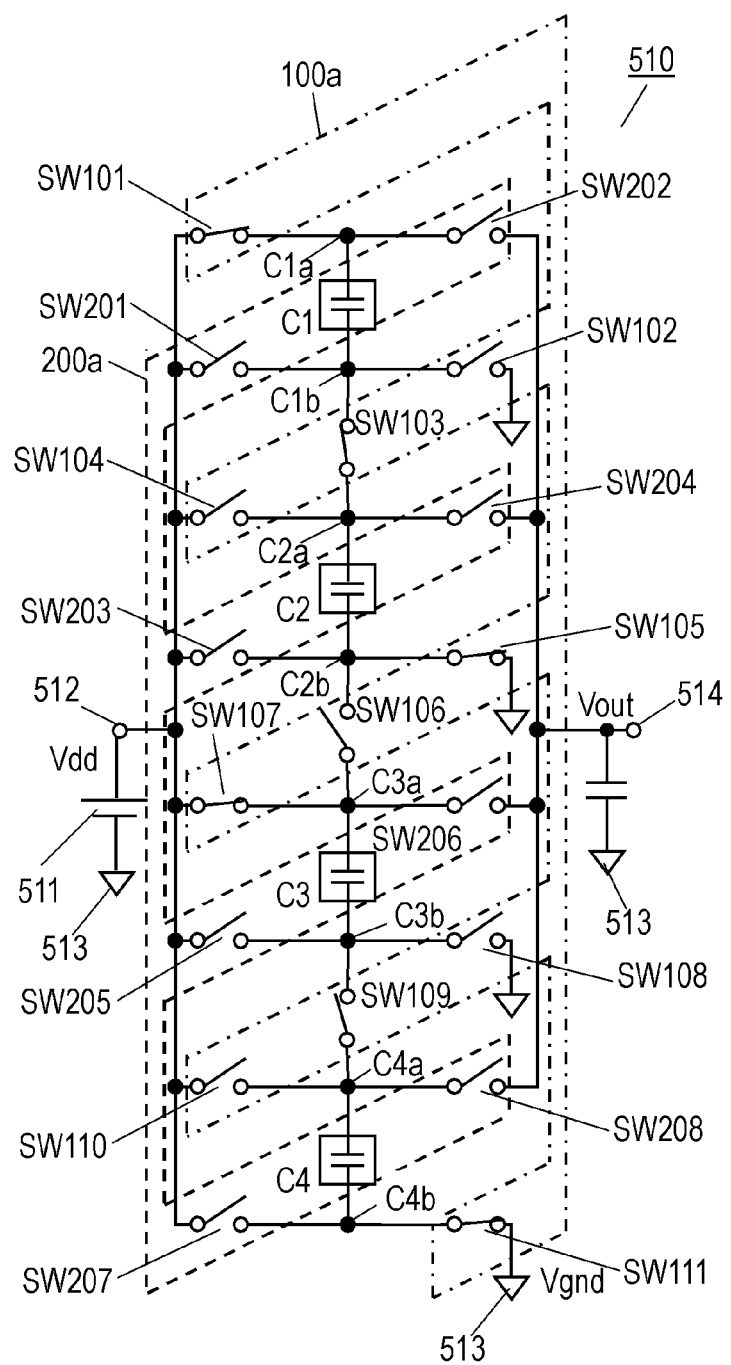
FIG. 18C is a circuit diagram of the booster circuit illustrated in FIG. 17 for illustrating another operation of the booster circuit.

In the operation illustrated in FIGS. 18B and 18C, booster circuit 510 outputs, from output terminal 514, boosted voltage Vout obtained by multiplying potential Vdd supplied to input terminal 512 by 1.5.

As illustrated in FIG. 18C, switches SW101, SW103, SW105, SW107, SW109 and SW111 of switch 100a are turned on, and the switches of switches 100a and 200a other than switches SW101, SW103, SW105, SW107, SW109 and SW111 are maintained being turned off, such that capacitors C1 and C2 are connected to input terminal 512 (potential Vdd) and common terminal 513 (potential Vgnd) in series with each other between input terminal 512 and common terminal 513, and simultaneously, capacitors C3 and C4 are connected to input terminal 512 (potential Vdd) and common terminal 513 (potential Vgnd) in series with each other between input terminal 512 and common terminal 513. Consequently, each of capacitors C1 to C4 is charged at a voltage of 0.5×Vdd.

Then, as illustrated in FIG. 18B, all switches SW101 to SW111 of switch 100a are turned off, and switches SW201 to SW208 of switch 200a are turned on. Consequently, capacitors C1 to C4 charged at a voltage of 0.5×Vdd, are connected to input terminal 512 (potential Vdd) and output terminal 514 in parallel with each other between input terminal 512 and output terminal 514. Consequently, capacitors C1 to C4 are discharged such that the voltage of 0.5×Vdd of each of capacitors C1 to C4 is added to potential Vdd of input terminal 512, and voltage Vout of 1.5×Vdd (=Vdd+0.5×Vdd) is output from output terminal 514.

Figure 18D:
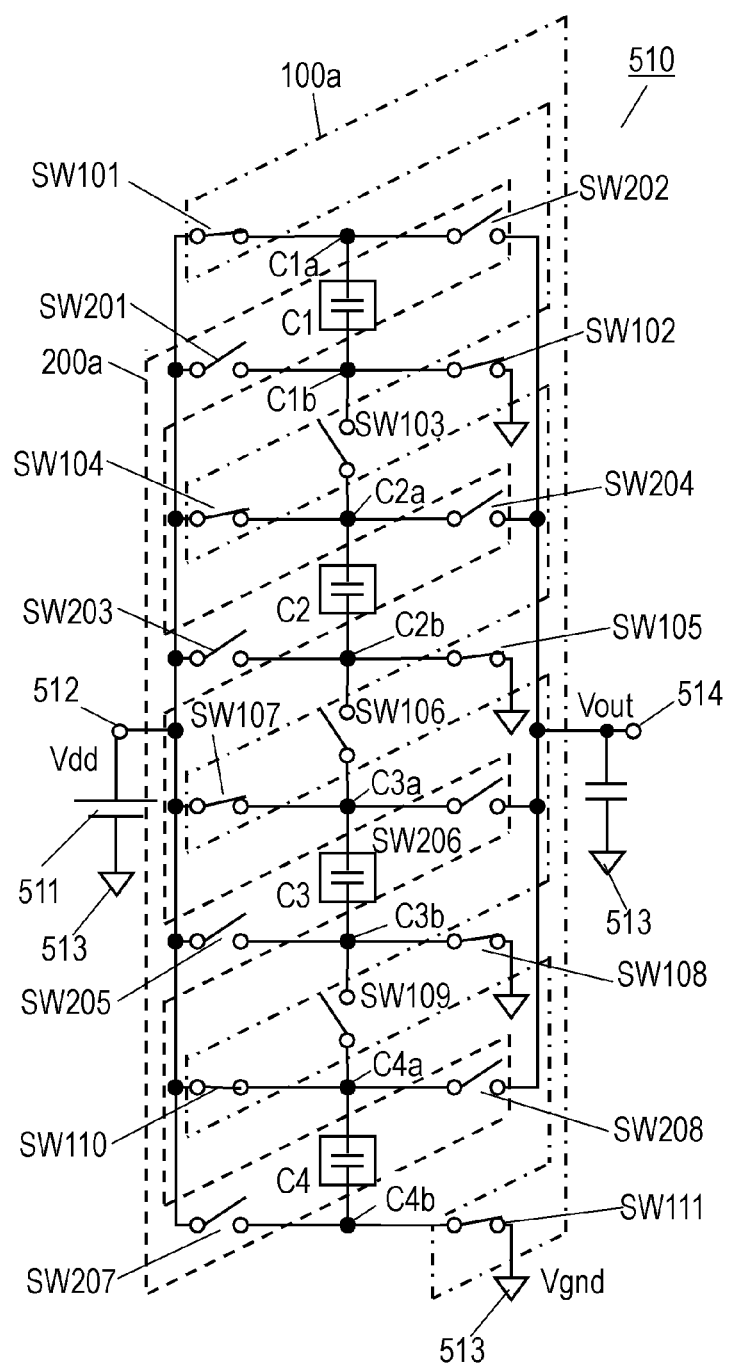
FIG. 18D is a circuit diagram of the booster circuit illustrated in FIG. 17 for illustrating still another operation of the booster circuit.

In the operation illustrated in FIGS. 18B and 18D, booster circuit 510 outputs, from output terminal 514, boosted voltage Vout obtained by multiplying potential Vdd supplied to input terminal 512 by 2.0.

As illustrated in FIG. 18D, switches SW101, SW102, SW104, SW105, SW107, SW108, SW110 and SW111 of switch 100a are turned on, and switches of switches 100a and 200a other than switches SW101, SW102, SW104, SW105, SW107, SW108, SW110 and SW111 are maintained being turned off, such that capacitors C1 to C4 are connected to input terminal 512 (potential Vdd) and common terminal 513 (potential Vgnd) in parallel with each other between input terminal 512 and common terminal 513. Consequently, each of capacitors C1 to C4 is charged at a voltage of Vdd.

Then, as illustrated in FIG. 18B, all switches SW101 to SW111 of switch 100a are turned off, and switches SW201 to SW208 of switch 200a are turned on. Consequently, capacitors C1 to C4 charged at a voltage of Vdd are connected to input terminal 512 (potential Vdd) and output terminal 514 in parallel with each other between input terminal 512 and output terminal 514. Consequently, capacitors C1 to C4 are discharged such that voltage Vdd of each of capacitors C1 to C4 is added to potential Vdd of input terminal 512, and voltage Vout of 2×Vdd (=Vdd+Vdd) is output from output terminal 514.

Booster circuit 510 according to Embodiment 4 can suppress reduction in discharge capability of output, and effects thereof will be described below.

Figure 19:
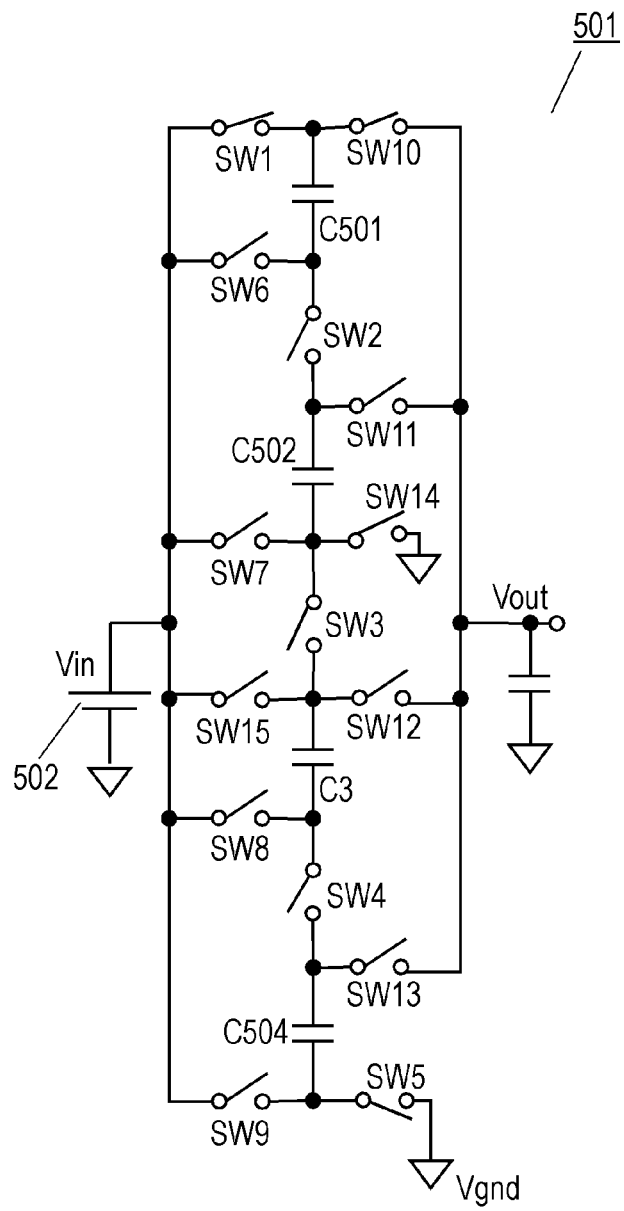
FIG. 19 is a circuit diagram of a booster circuit of a comparative example.

FIG. 19 is a circuit diagram of a booster circuit of a comparative example. Booster circuit 501 includes capacitors C501 to C504, and switches SW1 to SW15 connected to capacitors C501 to C504. Capacitors C501 to C504 have the same capacitance C. Booster circuit 501 provides output voltage Vout by boosting power supply potential Vin of voltage source 502.

Figure 20A:
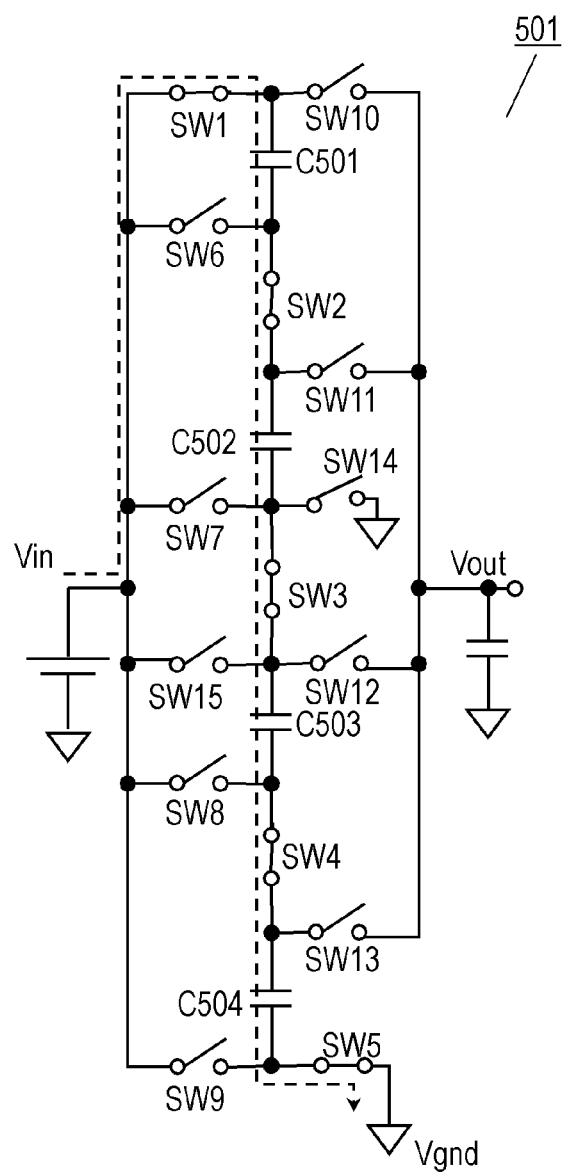
FIG. 20A is a circuit diagram of the booster circuit of the comparative example for illustrating operation of the booster circuit.
Figure 20B:
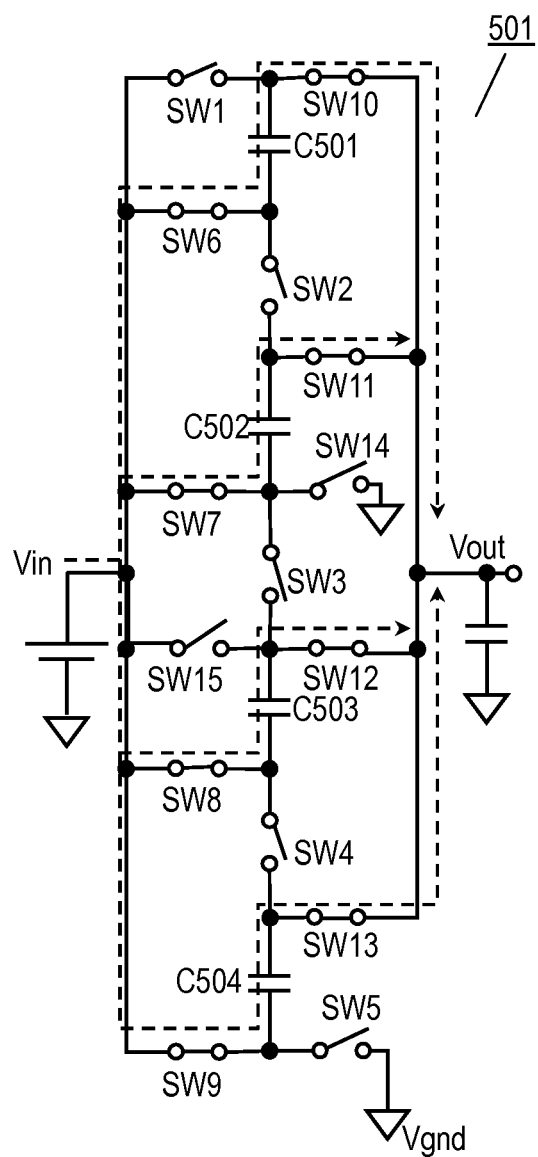
FIG. 20B is a circuit diagram of the booster circuit of the comparative example for illustrating an operation of the booster circuit.

An operation of booster circuit 501 of the comparative example will be described below. FIGS. 20A and 20B illustrates the operation of booster circuit 501. FIG. 20A illustrates a connection of capacitors C501 to C504 during charging, and FIG. 20B illustrates a connection of capacitors C501 to C504 during discharging. In the operation illustrated in FIGS. 20A and 20B, output voltage Vout is obtained by multiplying power supply potential Vin by 1.25.

First, switches SW1 to SW5 are closed, and switches SW6 to SW15 open, such that capacitors C501 to C504 are connected in series, as illustrated in FIG. 20A. Consequently, a voltage of 0.25 Vin is applied to each of capacitors C501 to C504. Then, as illustrated in FIG. 20B, switches SW1 to SW5 open, and simultaneously, switches SW6 to SW13 are closed, such that an output voltage is generated along a route illustrated by the broken line. Capacitors C501 to C504 have the same capacitance C. Therefore, the voltage of 0.25×Vin applied to each of capacitors C501 to C504 is added to voltage Vin, thereby obtaining output voltage Vout by multiplying power supply potential Vin by 1.25.

Figure 21A:
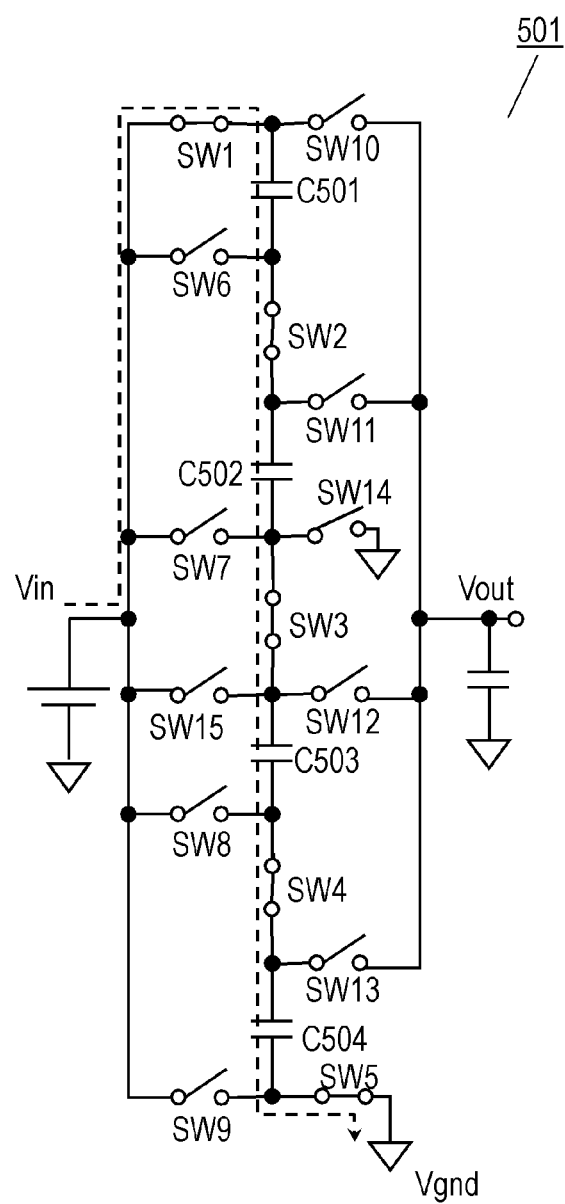
FIG. 21A is a circuit diagram of the booster circuit of the comparative example for illustrating another operation of the booster circuit.
Figure 21B:
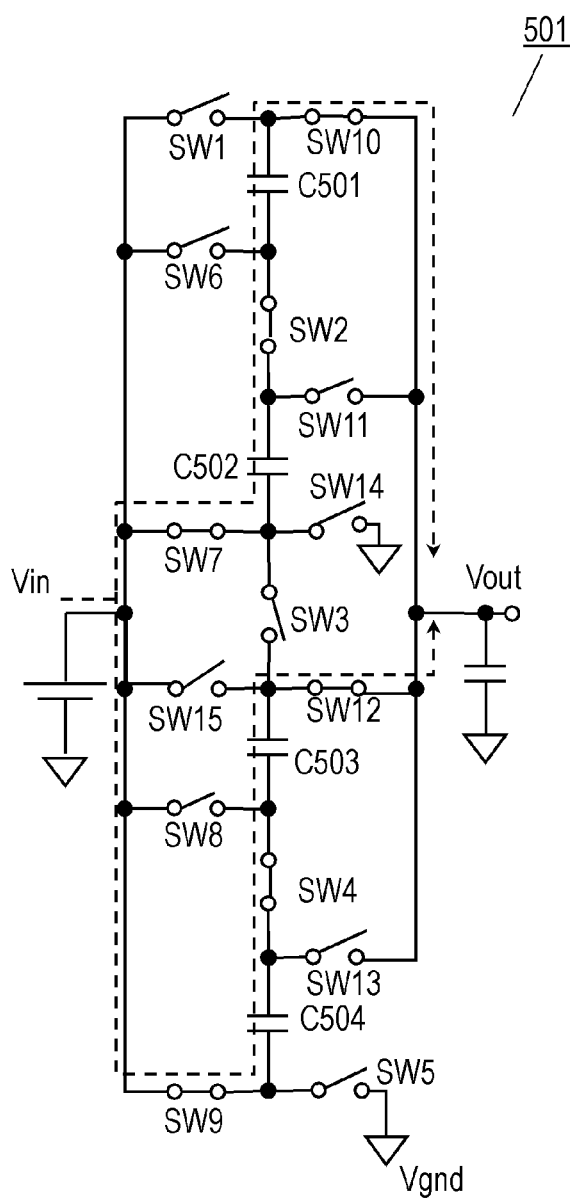
FIG. 21B is a circuit diagram of the booster circuit of the comparative example for illustrating another operation of the booster circuit.

FIGS. 21A and 21B illustrate another operation of booster circuit 501 of the comparative example. FIG. 21A illustrates a connection of capacitors C501 to C504 during charging, and FIG. 21B illustrates a connection of capacitors C501 to C504 during discharging. In the operation illustrated in FIGS. 21A and 21B, output voltage Vout is obtained by boosting power supply potential Vin by 1.5.

First, switches SW1 to SW5 are closed, and switches SW6 to SW15 open, such that capacitors C501 to C504 are connected in series, as illustrated in FIG. 21A. Consequently, a voltage of 0.25×Vin is applied to each of capacitors C501 to C504. Then, as illustrated in FIG. 21B, switches SW1, SW3 and SW5 open, and simultaneously, switches SW7, SW9, SW10 and SW12 are closed, such that output voltage Vout is generated along a route illustrated by the broken line. That is, a voltage of 0.5×Vin obtained by series connection of two capacitors C501 and C502 each charged at a voltage of 0.25×Vin, and series connection of two capacitors C503 and C504 each charged at a voltage of 0.25×Vin is added to voltage Vin, thereby obtaining output voltage Vout by boosting power supply potential Vin by 1.5.

Figure 22A:
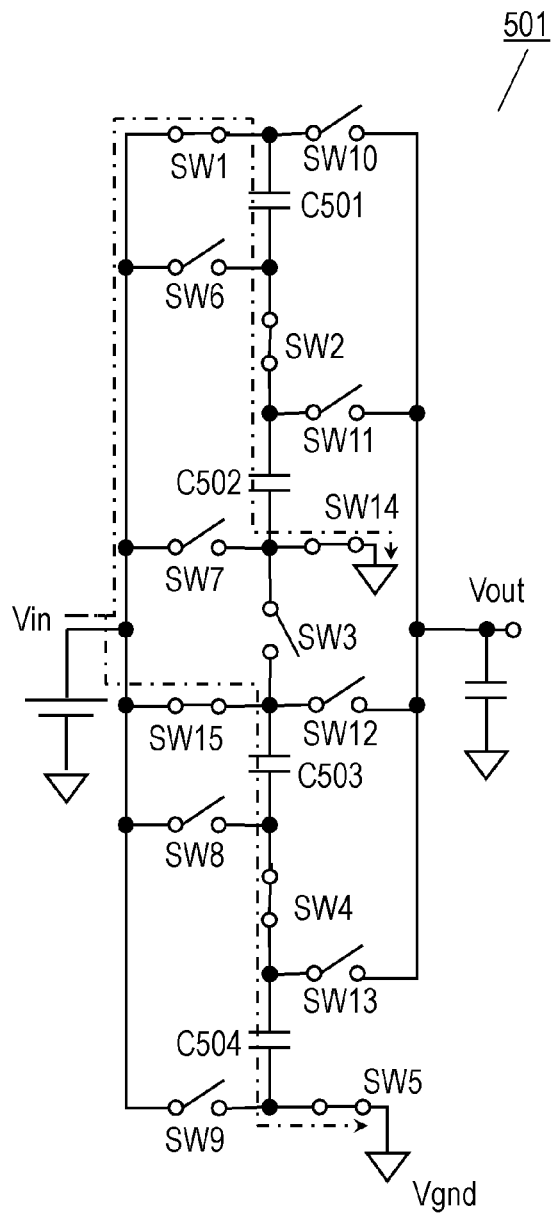
FIG. 22A is a circuit diagram of the booster circuit of the comparative example for illustrating still another operation of the booster circuit.
Figure 22B:
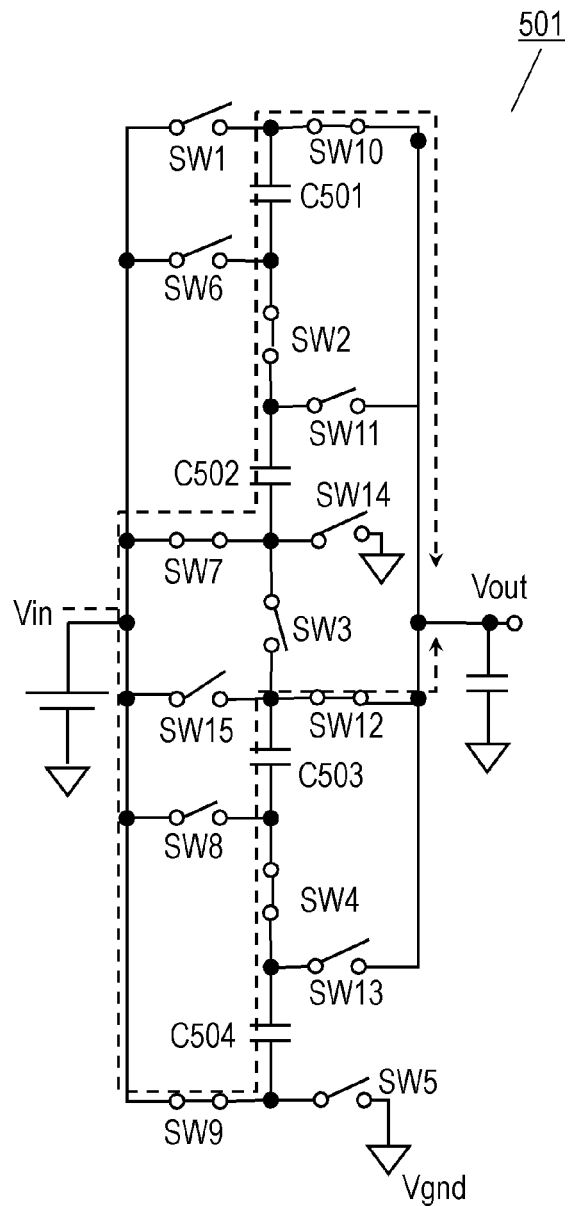
FIG. 22B is a circuit diagram of the booster circuit of the comparative example for illustrating a further operation of the booster circuit.

FIGS. 22A and 22B illustrate still another operation of booster circuit 501 of the comparative example. FIG. 22A illustrates a connection of capacitors C501 to C504 during charging, and FIG. 22B illustrates a connection of capacitors C501 to C504 during discharging. In the operation illustrated in FIGS. 22A and 22B, output voltage Vout is obtained by boosting power supply potential Vin by 2.0.

First, switches SW1, SW2, SW4, SW5, SW14 and SW15 are closed, and switches SW3, and SW6 to SW13 open, such that capacitors C501 and C502 are connected in series, and capacitors C503 and C504 are connected in series. Consequently, a voltage of 0.5×Vin is applied to each of capacitors C501 to C504. Then, as illustrated in FIG. 22B, switches SW1, SW5, SW14 and SW15 open, and simultaneously, switches SW7, SW9, SW10 and SW12 are closed, such that output voltage Vout is generated along a route illustrated the a broken line.

Consequently, a voltage generated by two capacitors C501 and C502 each charged at a voltage of 0.5×Vin are connected in series, and two capacitors C503 and C504 each charged at a voltage of 0.5×Vin are connected in series. Then, voltage Vin charged is added to voltage Vin, thereby obtaining output voltage Vout by boosting power supply potential Vin by 2.0.

As described above, four capacitors C501 to C504 can provide output voltage Vout by switching a ratio of boosting power supply potential Vin by 1.25, 1.5, and 2.0 times.

FIG. 23 illustrates an output current capability of booster circuit 510 according to Embodiment 4 illustrated in FIG. 17, and output current capability of booster circuit 501 of the comparative example illustrated in FIG. 19. The output current capability is product (I×t) of current I and time t which booster circuit 510 can output to a load connected to output terminal 514, namely an amount of electricity. For example, in a case where certain current I is stably and continuously discharged for time t, a capacitor necessarily has large capacitance C which is charged at voltage V.

As illustrated in FIG. 23, in booster circuit 501 of the comparative example, when a boosting ratio is increased, discharge capability decreases. This is caused by a configuration in which four capacitors C501 to C504 configured to finely switch the boosting ratio are connected in series at high boosting ratios (1.5 times, 2.0 times), resulting in that the combined capacitance of capacitors C501 to C504 obtained from the output terminal is reduced during discharging.

On the other hand, in booster circuit 510 according to Embodiment 4, reduction in output current capability is suppressed even when the boosting ratio is increased, as illustrated in FIG. 23. This is caused by a configuration in which, when charged capacitors C1 to C4 are discharged, capacitors C1 to C4 are connected in parallel to generate boosted voltage Vout. Therefore, the combined capacitance of capacitors C1 to C4 obtained from output terminal 514 is not reduced.

As described above, in booster circuit 510 according to Embodiment 4, switch 100a connects capacitors C1 to C4 in series or in parallel with each other between potential Vdd and potential Vgnd. Switch 200a connects capacitors C1 to C4 in parallel with each other between potential Vdd and output terminal 514. Consequently, even when capacitors C1 to C4 are discharged, it is possible to suppress eth reducing of the combined capacitance of capacitors C1 to C4 obtained viewed from output terminal 514, and to suppress reduction in output discharge capability.

Figure 24:
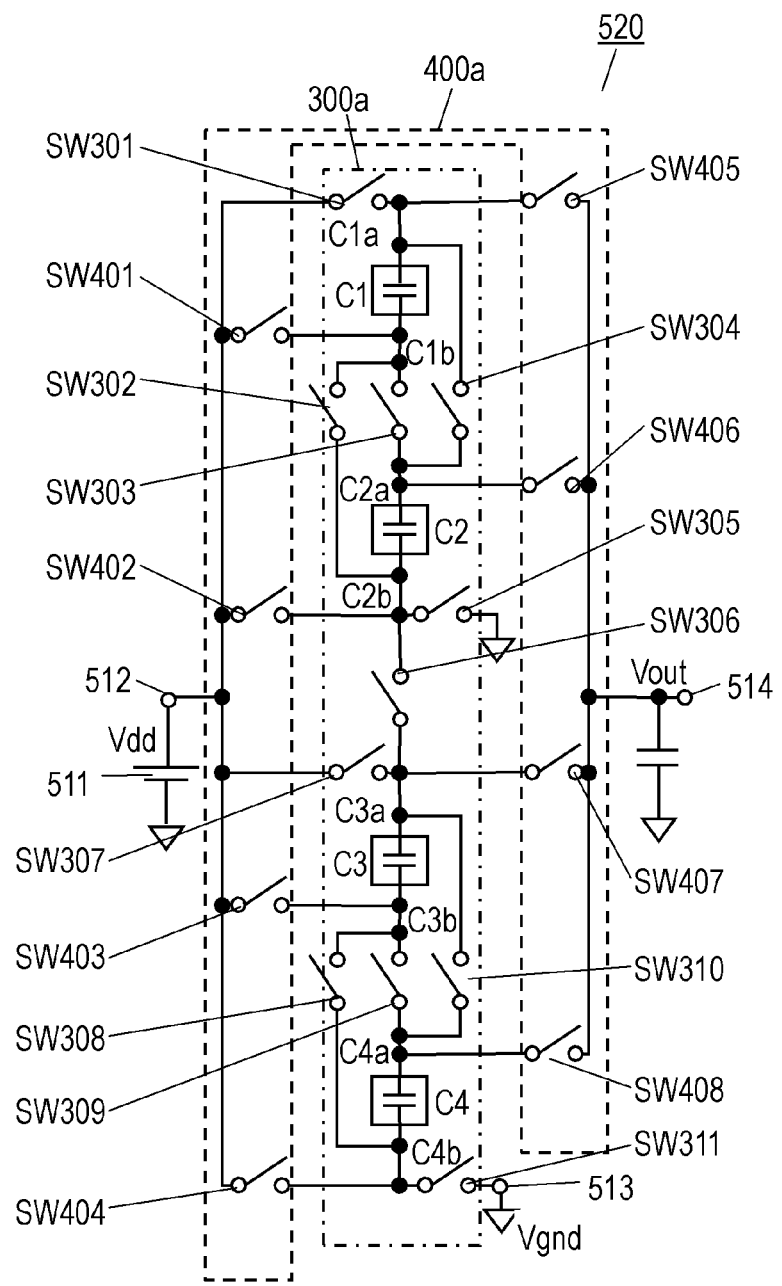
FIG. 24 is a circuit diagram of another booster circuit according to Embodiment 4.

FIG. 24 is a circuit diagram of another booster circuit 520 according to Embodiment 4. Booster circuit 520 can be used as booster circuit 19 according to Embodiments 1 and 2 illustrated in FIGS. 1B and 13. In FIG. 24, components identical to those of booster circuit 510 illustrated in FIG. 17 are denoted by the same reference numerals. Booster circuit 520 includes switches 300a and 400a instead of switches 100a and 200a of booster circuit 510 illustrated in FIG. 17. Switch 300a can switch between a series connection connecting capacitors C1 to C4 in series with each other between terminals 512 and 513 and a parallel connection connecting capacitors C1 to C4 in parallel with each other between terminals 512 and 513, similarly to switch 100a of booster circuit 510 illustrated in FIG. 17. Switch 400a can connect capacitors C1 to C4 in parallel with each other between terminals 512 and 514, similarly to switch 200a of booster circuit 510 illustrated in FIG. 17.

Switch 300a includes switches SW301 to SW311. Switch SW301 is connected to input terminal 512 and end C1a of capacitor C1 in series between input terminal 512 and end C1a. Switch SW302 is connected to ends C1b of capacitor C1 and end C2b of capacitor C2 in series between end C1b and end C2b. Switch SW303 is connected to end C1b of capacitor C1 and end C2a of capacitor C2 in series between end C1b and end C2a. Switch SW304 is connected to end C1a of capacitor C1 and end C2a of capacitor C2 in series between end C1a and end C2a. Switch SW305 is connected to common terminal 513 and end C2b of capacitor C2 in series between common terminal 513 and end C2b. Switch SW306 is connected to end C2b of capacitor C2 and C3a of capacitor C3 in series between end C2b and end C3a. Switch SW307 is connected to input terminal 512 and end C3a of capacitor C3 in series between input terminal 512 and end C3a. Switch SW308 is connected to end C3b of capacitor C3 and end C4b of capacitor C4 in series between end C3b and end C4b. Switch SW309 is connected to end C3b of capacitor C3 and end C4a of capacitor C4 in series between end C3b and end C4a. Switch SW310 is connected to end C3a of capacitor C3 and end C4a of capacitor C4 in series between end C3a and end C4a. Switch SW311 is connected to common terminal 513 and end C4b of capacitor C4 in series between common terminal 513 and end C4b.

Switch 400a includes switches SW401 to SW408. Switch SW401 is connected to input terminal 512 and end C1b of capacitor C1 in series between input terminal 512 and end C1b. Switch SW402 is connected to input terminal 512 and end C2b of capacitor C2 in series between input terminal 512 and end C2b. Switch SW403 is connected to input terminal 512 and end C3b of capacitor C3 in series between input terminal 512 and end C3b. Switch SW404 is connected to input terminal 512 and end C4b of capacitor C4 in series between input terminal 512 and end C4b. Switch SW405 is connected to output terminal 514 and end C1a of capacitor C1 in series between output terminal 514 and end C1a. Switch SW406 is connected to output terminal 514 and end C2a of capacitor C2 in series between output terminal 514 and end C2a. Switch SW407 is connected to output terminal 514 and end C3a of capacitor C3 in series between output terminal 514 and end C3a. Switch SW408 is connected to output terminal 514 and end C4a of capacitor C4 in series between output terminal 514 and end C4a.

Connections of capacitors C1 to C4 controlled by switching switches SW301 to SW311 of switch 300a will be described below. When the connection of capacitors C1 to C4 is switched by switch 300a (switches SW301 to SW311), switch 400a (switches SW401 to SW408) is turned off such that capacitors C1 to C4 are not connected to output terminal 514, and are disconnected from output terminal 514.

When switches SW301, SW303, SW306, SW309 and SW311 of switch 300a are turned on, and switches SW302, SW304, SW305, SW307, SW308 and SW310 of switch 300a are turned off, capacitors C1 to C4 are connected to input terminal 512 (potential Vdd) and common terminal (potential Vgnd) in series with each other between input terminal 512 and common terminal 513.

When switches SW301, SW303, SW305, SW307, SW309 and SW311 of switch 300a are turned on, and switches SW302, SW304, SW306, SW308 and SW310 are turned off, capacitors C1 and C2 are connected to input terminal 512 (potential Vdd) and common terminal 513 (potential Vgnd) in series with each other between input terminal 512 and common terminal 513, and capacitors C3 and C4 are connected to input terminal 512 (potential Vdd) and common terminal 513 (potential Vgnd) in series with each other between input terminal 512 and common terminal 513 at the same time.

When switches SW301, SW302, SW304, SW306, SW308, SW310 and SW311 of switch 300a are turned on, and switches SW303, SW305, SW307 and SW309 are turned off, capacitors C1 and C2 are connected in parallel with each other to form a parallel connection assembly, and capacitors C3 and C4 are connected in parallel with each other to form another parallel connection assembly. These two parallel connection assemblies are connected to input terminal 512 (potential Vdd) and common terminal 513 (potential Vgnd) in series with each other between input terminal 512 and common terminal 513.

Next, connections of capacitors C1 to C4 controlled by switching switches SW401 to SW408 of switch 400a will be described. When the connection of capacitors C1 to C4 is switched by using switch 400a, switches SW301, SW305, SW307 and SW311 of switch 300a are turned off.

First, when switches SW401 to SW408 of switch 400a are turned on, and switches SW301 to SW311 of switch 300a are turned off, capacitors C1 to C4 are connected to input terminal 512 (potential Vdd) and output terminal 514 in parallel with each other between input terminal 512 and output terminal 514.

When switches SW402, SW404, SW405 and SW407 of switch 400a and switches SW302, SW304, SW308 and SW310 of switch 300a are turned on, and switches SW401, SW403, SW406 and SW408 of switch 400a and switches SW303, SW306 and SW309 of switch 300a each are in an OFF state, capacitors C1 and C2 are connected in parallel with each other to form a parallel connection assembly, and capacitors C3 and C4 are connected in parallel with each other to form another parallel connection assembly. These two parallel connection assemblies are connected to input terminal 512 (potential Vdd) and output terminal 514 in parallel with each other between input terminal 512 and output terminal 514. That is, capacitors C1 to C4 are connected to input terminal 512 (potential Vdd) and output terminal 514 in parallel with each other between input terminal 512 and output terminal 514.

An operation of booster circuit 520 will be described below. FIGS. 25A to 25E are circuit diagrams illustrating the operation of booster circuit 520.

Figure 25A:
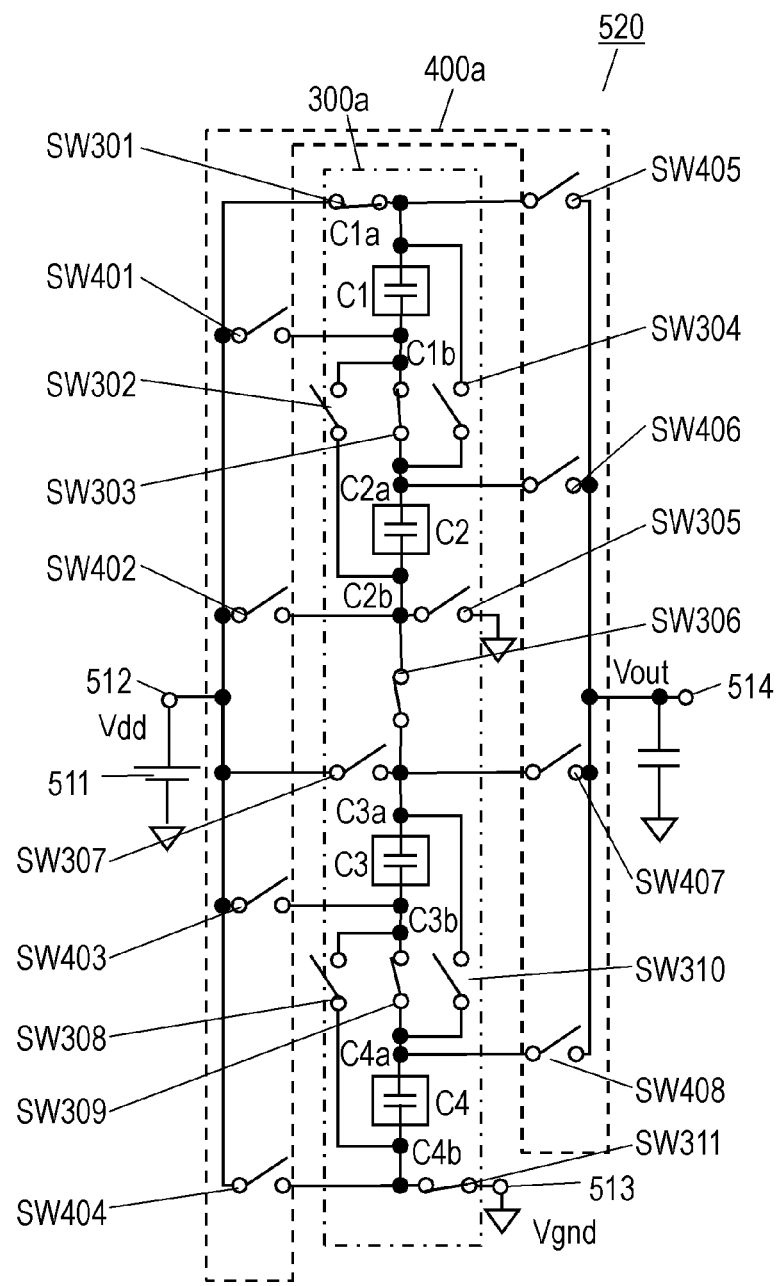
FIG. 25A is a circuit diagram of the booster circuit illustrated in FIG. 24 for illustrating an operation of the booster circuit.
Figure 25B:
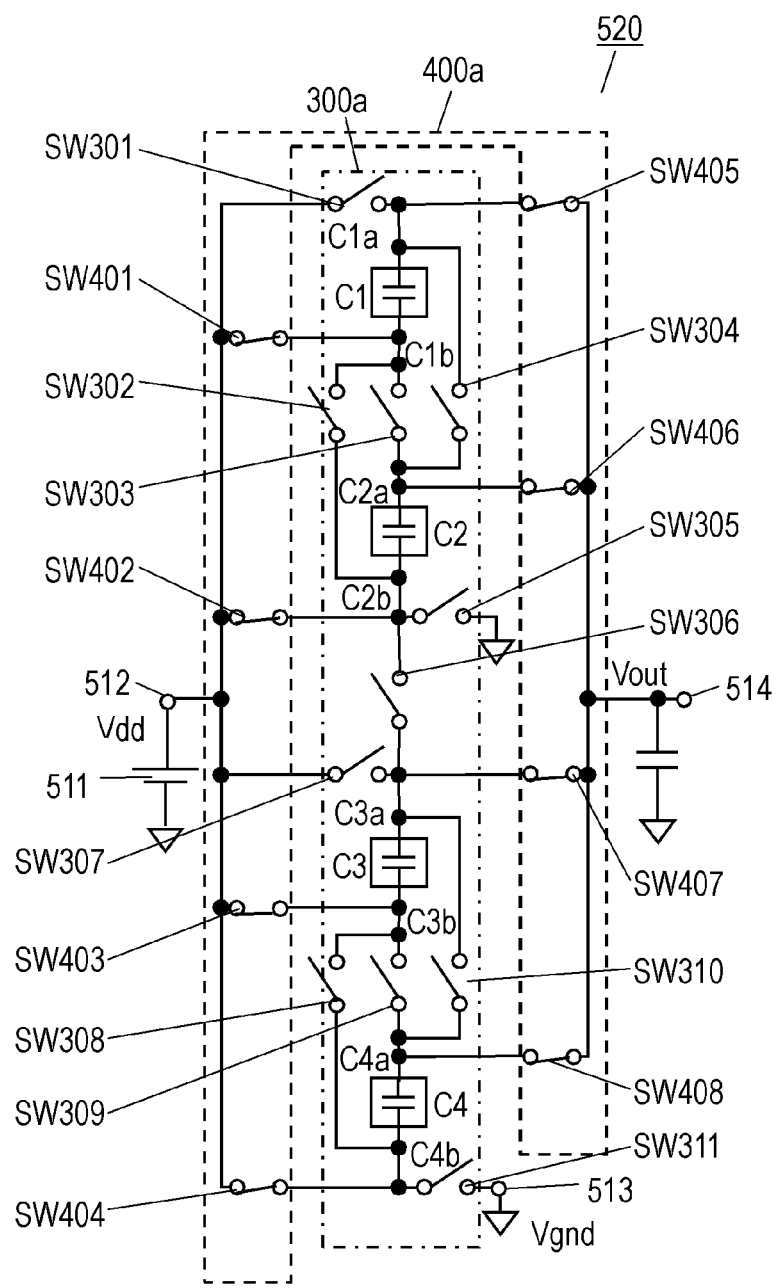
FIG. 25B is a circuit diagram of the booster circuit illustrated in FIG. 24 for illustrating an operation of the booster circuit.

In the operation illustrated in FIGS. 25A and 25B, booster circuit 520 outputs, from output terminal 514, a boosted voltage obtained by multiplying potential Vdd supplied to input terminal 512 by 1.25, as output voltage Vout.

As illustrated in FIG. 25A, switches SW301, SW303, SW306, SW309 and SW311 of switch 300a are turned on, and the switches of switches 300a and 400a other than switches SW301, SW303, SW306, SW309 and SW311 are maintained being turned off, such that capacitors C1 to C4 are connected to input terminal 512 (potential Vdd) and common terminal 514 (potential Vgnd) in series with each other between input terminal 512 and common terminal 514. Consequently, each of capacitors C1 to C4 is charged at a voltage of 0.25×Vdd.

Then, as illustrated in FIG. 25B, switches SW401 to 408 of switch 400a are turned on, and switches SW301 to SW311 of switch 300a are turned off, such that capacitors C1 to C4 are connected to input terminal 512 (potential Vdd) and output terminal 514 in parallel with each other between input terminal 512 and output terminal 514. Consequently, capacitors C1 to C4 are discharged such that the voltage of 0.25×Vdd of each of capacitors C1 to C4 is added to potential Vdd of input terminal 512, and voltage Vout of 1.25×Vdd (=Vdd+0.25×Vdd) is output between output terminal 514 and common terminal 513.

Figure 25C:
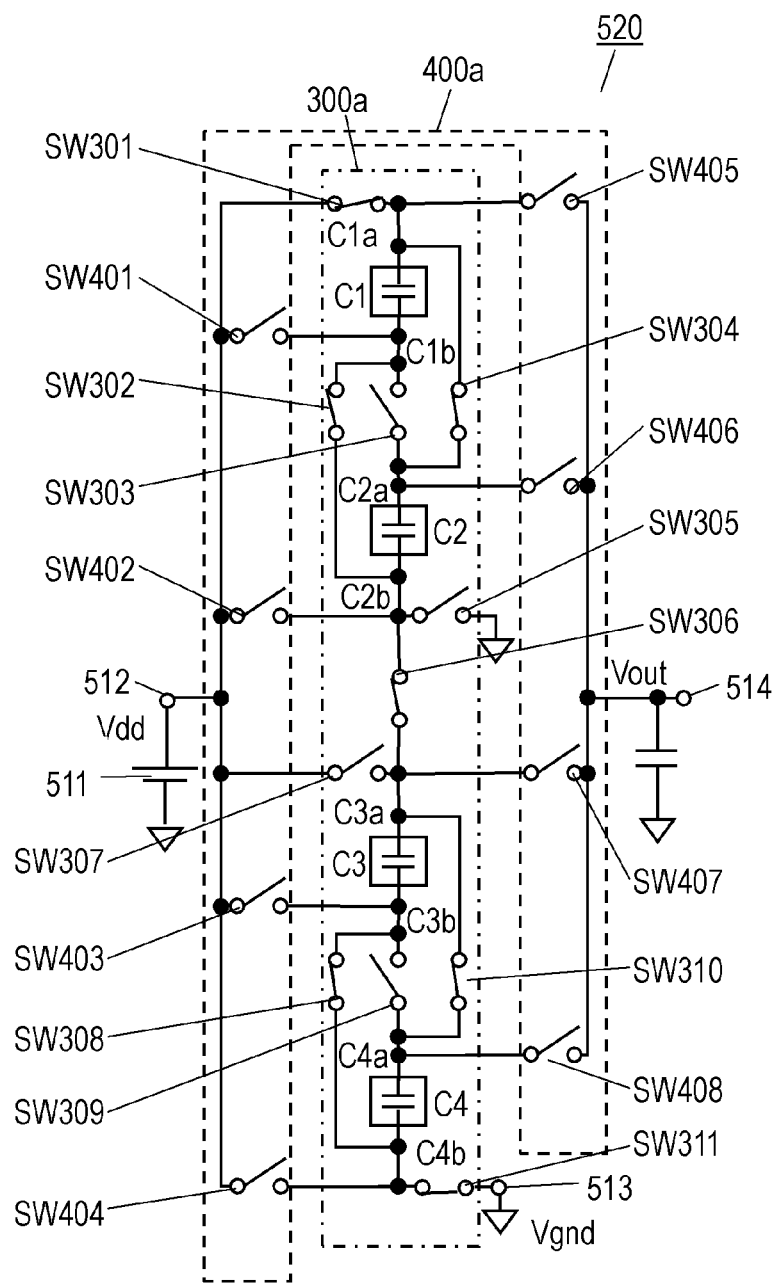
FIG. 25C is a circuit diagram of the booster circuit illustrated in FIG. 24 for illustrating another operation of the booster circuit.

In the operation illustrated in FIGS. 25B and 25C, booster circuit 520 outputs, from output terminal 514, boosted voltage Vout obtained by multiplying potential Vdd supplied to input terminal 512 by 1.5.

As illustrated in FIG. 25C, switches SW301, SW302, SW304, SW306, SW308, SW310 and SW311 of switch 300a are turned on, and the switches of switches 300a and 400a other than switches SW301, SW302, SW304, SW306, SW308, SW310 and SW311 are maintained being turned off, such that capacitors C1 and C2 are connected in parallel with each other to form a parallel connection assembly, and capacitors C3 and C4 are connected in parallel with each other to form another parallel connection assembly. These two parallel connection assemblies are connected to input terminal 512 (potential Vdd) and common terminal 513 (potential Vgnd) in series with each other between input terminal 512 and common terminal 513. Consequently, each of capacitors C1 to C4 is charged at a voltage of 0.5×Vdd.

Then, as illustrated in FIG. 25B, switches SW401 to 408 of switch 400a are turned on, switches SW301 to SW311 of switch 300a are turned off, such that capacitors C1 to C4 are connected to input terminal 512 (potential Vdd) and output terminal 514 in parallel with each other between input terminal 512 and output terminal 514. Consequently, capacitors C1 to C4 are discharged such that the voltage of 0.5×Vdd of each of capacitors C1 to C4 is added to potential Vdd of input terminal 512, and voltage Vout of 1.5×Vdd (=Vdd+0.5×Vdd) is output between output terminal 514 and common terminal 513.

Figure 25D:
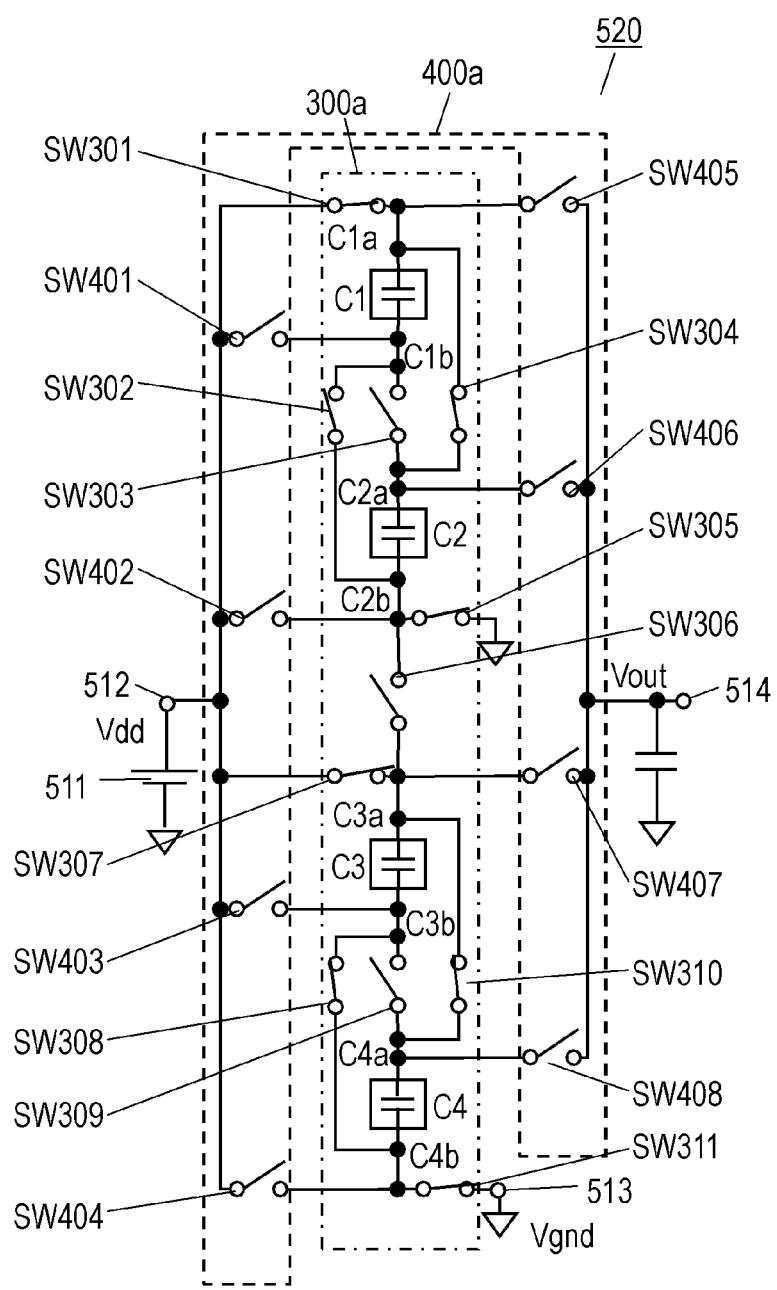
FIG. 25D is a circuit diagram of the booster circuit illustrated in FIG. 24 for illustrating still another operation of the booster circuit.

In the operation illustrated in FIGS. 25B and 25D, booster circuit 520 outputs, from output terminal 514, boosted voltage Vout obtained by multiplying potential Vdd supplied to input terminal 512 by 2.0.

As illustrated in FIG. 25D, switches SW301, SW302, SW304, SW305, SW307, SW308, SW310 and SW311 of switch 300a are turned on, and the switches of switches 300a and 400a other than switches SW301, SW302, SW304, SW305, SW307, SW308, SW310 and SW311 are turned off, such that capacitors C1 to C4 are connected to input terminal 512 (potential Vdd) and common terminal 613 (potential Vgnd) in parallel with each other between input terminal 512 and common terminal 513. Consequently, each of capacitors C1 to C4 is charged at a voltage of Vdd.

Then, as illustrated in FIG. 25B, switches SW401 to 408 of switch 400a are turned on, and switches SW301 to SW311 of switch 300a are turned off, such that capacitors C1 to C4 are connected to input terminal 512 (potential Vdd) and output terminal 514 in parallel with each other between input terminal 512 and output terminal 514. Consequently, capacitors C1 to C4 are discharged such that voltage Vdd of each of capacitors C1 to C4 is added to potential Vdd of input terminal 512, and voltage Vout of 2.0×Vdd (=Vdd+Vdd) is output between output terminal 514 and common terminal 513.

Figure 25E:
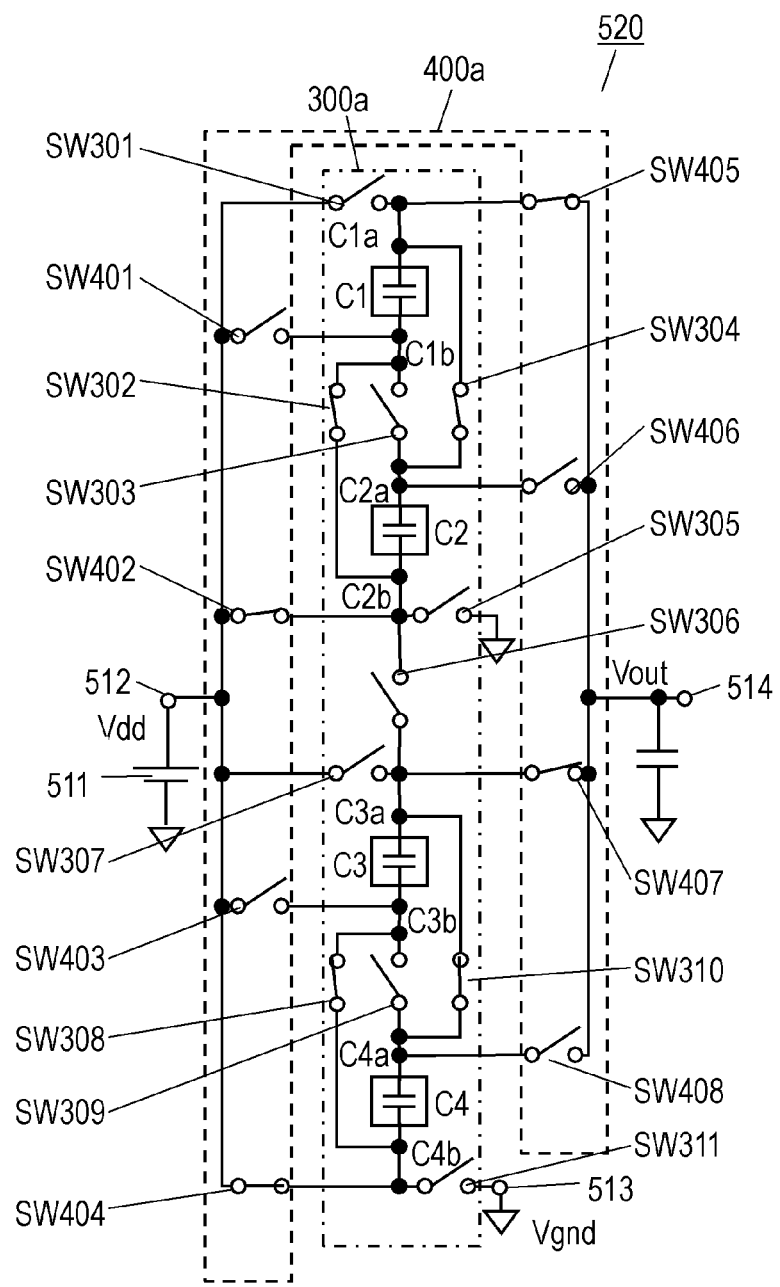
FIG. 25E is a circuit diagram illustrating yet different operation of the booster circuit illustrated in FIG. 24.

In the operation illustrated in FIG. 25E, switches SW302, SW304, SW308 and SW310 of switch 300a and switches SW402, SW404, SW405 and SW407 of switch 400a are turned on, and the switches of switches 300a and 400a other than switches SW302, SW304, SW308, SW310, SW402, SW404, SW405 and SW407 are turned off. Consequently, capacitors C1 to C4 are connected to input terminal 512 (potential Vdd) and output terminal 514 in parallel with each other between input terminal 512 and output terminal 514. Therefore, booster circuit 520 can similarly connect terminals 512 and 513 with capacitors C1 to C4 even when the operation illustrated in FIG. 25E is performed instead of the operation illustrated in FIG. 25B.

FIG. 23 illustrates an output current capability of booster circuit 520 illustrated in FIG. 24. In booster circuit 520, reduction in an output current capability is suppressed even when a boosting ratio is increased as illustrated in FIG. 23, similarly to booster circuit 510 illustrated in FIG. 17. This is caused by a configuration in which when charged capacitors C1 to C4 are discharged, capacitors C1 to C4 are connected in parallel to generate boosted voltage Vout. Therefore, the combined capacitance of capacitors C1 to C4 obtained from output terminal 514 is not reduced.

As described above, also in booster circuit 520, switch 300a connects capacitors C1 to C4 in series or in parallel with each other between input terminal 512 (potential Vdd) and common terminal 513 (potential Vgnd). Switch 400a connects capacitors C1 to C4 in parallel with each other between input terminal 512 (potential Vdd) and output terminal 514. Consequently, even when capacitors C1 to C4 are discharged, it is possible to suppress reduction in the combined capacitance of capacitors C1 to C4 obtained from output terminal 514, and to suppress reduction in the output discharge capability of booster circuit 520.

Booster circuit 510 (520) illustrated in FIG. 17 (FIG. 24) includes four capacitors C1 to C4, but the number of the capacitors is not limited to this, and booster circuit 510 (520) may include plural capacitors. Booster circuit 510 (520) may include, for example, five capacitors. In this case, first, in switch 100a (300a), five capacitors are connected to input terminal 512 and common terminal 513 in series with each other between input terminal 512 (potential Vdd) and common terminal 513 (potential Vgnd), such that each capacitor is charged at a voltage of 0.2×Vdd. Then, the five charged capacitors are connected to input terminal 512 and output terminal 514 in parallel with each other between input terminal 512 and output terminal 514 to be discharged, such that the booster circuit can output a boosted voltage of 1.2×Vdd (=Vdd+0.2×Vdd) from the output terminal while maintaining its discharge capability.

Figure 26:
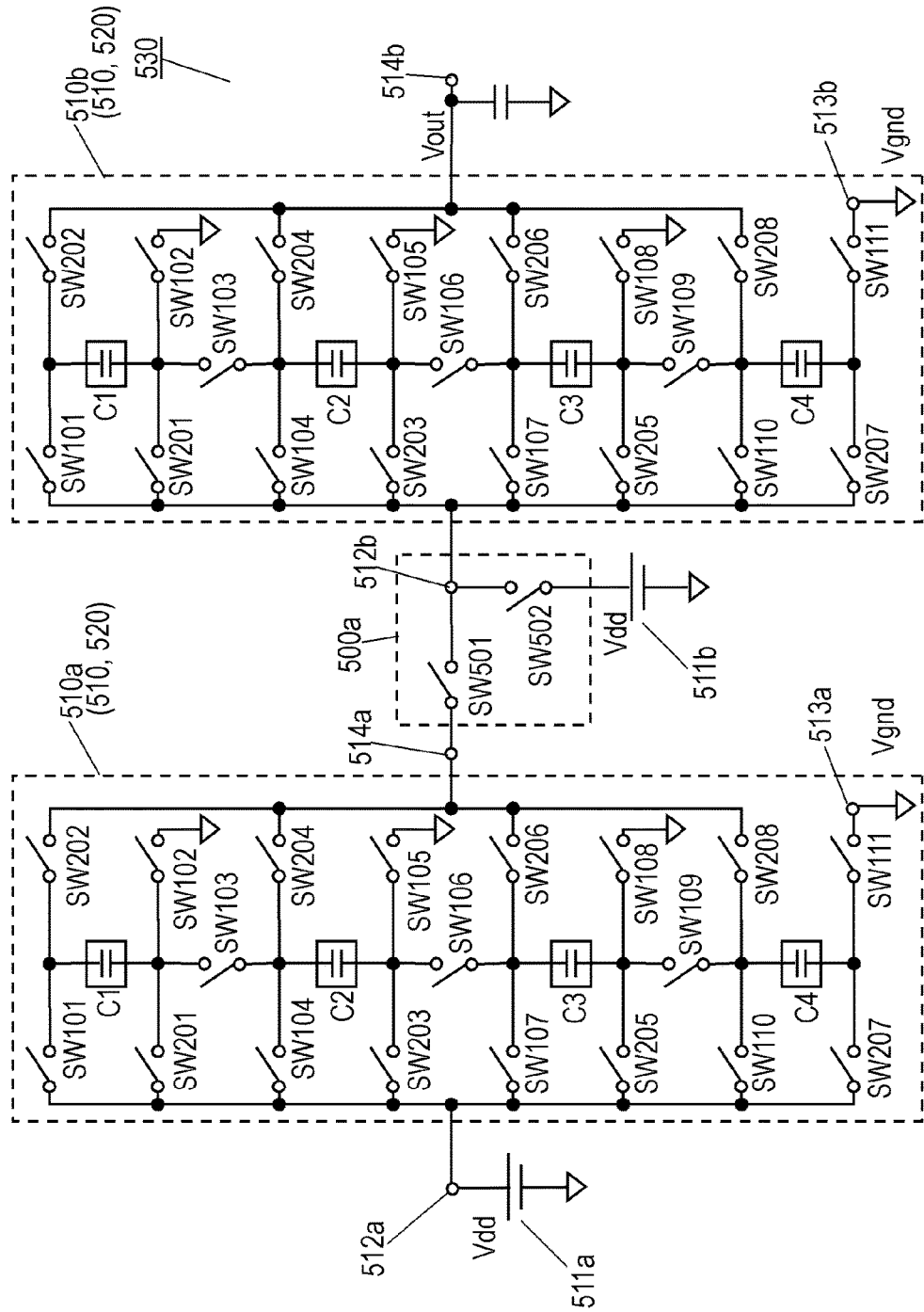
FIG. 26 is a circuit diagram of a booster apparatus according to Embodiment 4.

FIG. 26 is a circuit diagram of booster apparatus 530 according to Embodiment 4. Booster apparatus 530 can be used as booster circuit 19 according to Embodiments 1 and 2 illustrated in FIGS. 1B and 13. Booster apparatus 530 includes booster circuit 510a, switch 500a connected to booster circuit 510a, and booster circuit 510b connected to booster circuit 510a via switch 500a. Booster circuits 510a and 510b includes input terminals 512a and 512b, common terminals 513a and 513b, and output terminals 514a and 514b, respectively. Booster circuits 510a and 510b have the same configuration as booster circuit 510 illustrated in FIG. 17. Each of input terminals 512a and 512b of booster circuits 510a and 510b corresponds to input terminal 512 of booster circuit 510, each of common terminals 513a and 513b of booster circuits 510a and 510b corresponds to common terminal 513 of booster circuit 510, and each of output terminals 514a and 514b of booster circuits 510a and 510b corresponds to output terminal 514 of booster circuit 510. Thus, in booster apparatus 530, output terminal 514a of booster circuit 510a is connected to input terminal 512b of booster circuit 510b via switch 500a. That is, two booster circuits 510a and 510b are connected in cascade. This configuration can control the boosting ratio more precisely.

A configuration of booster apparatus 530 will be detailed below. Voltage source 511a supplies potential Vdd to input terminal 512a of booster circuit 510a. Switch 500a that connects booster circuits 510a and 510b includes switches SW501 and SW502. Switch SW501 is connected to terminals 514a and 512b in series between output terminal 514a of booster circuit 510a and input terminal 512b of booster circuit 510b. Switch SW502 is connected to voltage source 511b and input terminal 512b in series between voltage source 511b and input terminal 512b of booster circuit 510b. Voltage source 511b supplies potential Vdd to input terminal 512b via switch SW502.

An operation of booster apparatus 530 will be described below. In booster apparatus 530, a voltage obtained by adding, to a potential of input terminal 512a of booster circuit 510a, a voltage between input terminal 512a and output terminal 514a of booster circuit 510a and a voltage between input terminal 512b and output terminal 514b of booster circuit 510b is output from output terminal 514b. For example, while switch SW501 of switch 500a is turned off and switch SW502 is turned on, booster circuit 510a operates similarly to booster circuit 510 illustrated in FIG. 18C, and thus, each of capacitors C1 to C4 of booster circuit 510a is charged at a voltage of 0.5×Vdd. Booster circuit 510b operates similarly to booster circuit 510 illustrated in FIG. 18A, and thus, each of capacitors C1 to C4 of booster circuit 510b is charged at a voltage of 0.25×Vdd. Then, switch SW501 of switch 500a is turned on and switch SW502 is turned off, and thereby, both booster circuits 510a and 510b operate similarly to booster circuit 510 illustrated in FIG. 18B, and thus, each of capacitors C1 to C4 of booster circuit 510a is connected to terminals 512a and 514a in parallel with each other between input terminal 512a and output terminal 514a, and each of capacitors C1 to C4 of booster circuit 510b is connected to terminals 512b and 514b in parallel with each other between input terminal 512b and output terminal 514b. Consequently, a voltage of 1.5×Vdd (=Vdd+0.5×Vdd) is output from output terminal 514a of booster circuit 510a, and voltage Vout of 1.75×Vdd (=1.5×Vdd+0.25×Vdd) is output from output terminal 514b of booster circuit 510b.

Booster apparatus 530 allows booster circuits 510a and 510b to variously operate, such that voltage Vout can be determined to have various values. In the case where the same potential Vdd is supplied to each of input terminals 512a and 512b of booster circuits 510a and 510b, switch SW502 may be connected to input terminals 512a and 512b in series between input terminals 512a and 512b of booster circuits 510a and 510b instead of a connection of switch SW502 to voltage source 511b. Additionally, voltage sources 511a and 511b may have different voltages from each other, such that, in booster apparatus 530, voltage Vout of output terminal 514b can be more precisely determined, and thus controlling the boosting ratio more precisely.

Each of booster circuits 510a and 510b of booster apparatus 530 according to Embodiment 4 is booster circuit 510 illustrated in FIG. 17. However, even booster circuits 510a and 510b may be booster circuit 520 illustrated in FIG. 24, providing the same effects.

Thus, booster apparatus 530 including booster circuits 510 and 520 according to Embodiment 4 can precisely set the boosting ratio with high power conversion efficiency. Additionally, booster apparatus 530 including booster circuits 510 and 520 allows the boosting ratio to be set to a combination of plural capacitors having the same capacitance connected in series, hence providing a small-sized circuit. Furthermore, in booster apparatus 530 including booster circuits 510 and 520, capacitors are connected in parallel in accordance with the boosting ratio, and therefore, a discharge capability (output current capability) is large, and load drive capability is excellent as well.

The booster circuits and the booster apparatus according to Embodiment are applicable to various electronic devices. For example, each booster circuit according to Embodiment 4 is applicable to an inertial sensor, an LED unit, a power supply device, a battery unit, and the like.

Exemplary Embodiment 5

Figure 27:
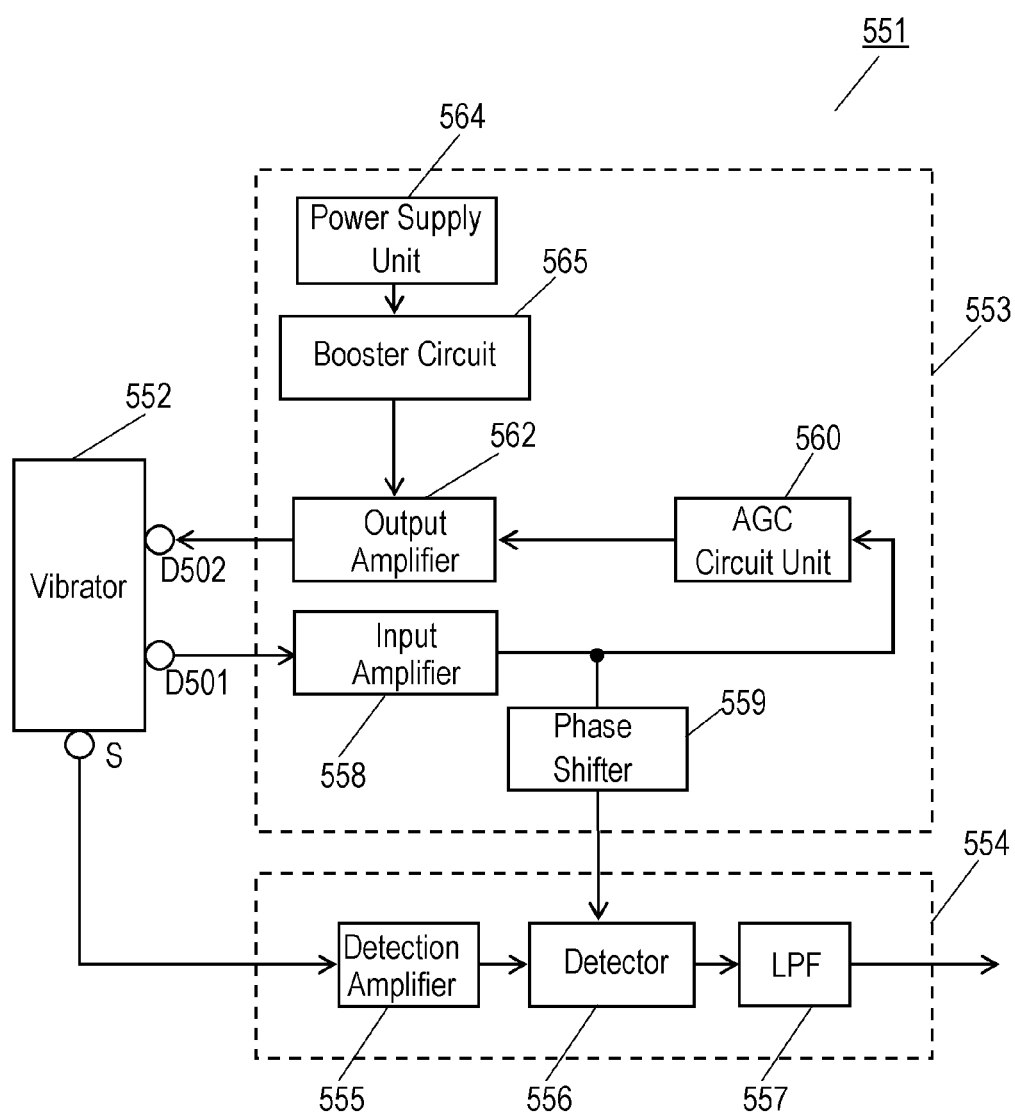
FIG. 27 is a block diagram of a physical quantity detection apparatus according to Exemplary Embodiment 5.

FIG. 27 is a block diagram of physical quantity detection apparatus 551 according to Embodiment 5. Physical quantity detection apparatus 551 according to Embodiment 5 is an angular velocity sensor that detects an angular velocity, and includes booster circuit 510 or 520 or booster apparatus 530 according to Embodiment 4.

Physical quantity detection apparatus 551 includes vibrator 552, drive circuit 553 for driving and vibrating vibrator 552 with a drive signal, and detection circuit 554. Detection circuit 554 detects a detection signal (charges) generated in vibrator 552 due to inertial force externally applied to vibrator 552.

Detection circuit 554 includes detection amplifier 555, detector 556, and low pass filter (LPF) 557. According to Embodiment 5, detection amplifier 555 is an I/V conversion amplifier that converts a current into a voltage.

Input amplifier 558 provided at an initial stage of drive circuit 553 includes an operational amplifier, a feedback resistor Rf, and a feedback capacitance Cf, and is an integral type current/voltage conversion amplifier having a low pass filter characteristic. Input amplifier 558 is a component of an oscillation loop, and converts a monitor signal (charges) from vibrator 552 into a voltage signal. Input amplifier 558 having the low pass filter characteristic can effectively suppress unnecessary vibration. Drive circuit 553 includes phase shifter 559 shifts a phase of this voltage signal by 90 degrees to output the voltage signal having the shifted phase to detection circuit 554, and automatic gain control (AGC) circuit unit 560 having a gain of the oscillation loop automatically adjusted in accordance with this voltage signal.

AGC circuit unit 560 automatically adjusts the gain such that a loop gain of the oscillation loop becomes 1 in a stable state of vibration. Output amplifier 562 provided at a post stage of drive circuit 553 outputs, to vibrator 552, a drive signal obtained by amplifying the signal from AGC circuit unit 560. Output amplifier 562 is a V/V conversion amplifier that converts a voltage into a voltage.

Vibrator 552 is connected to drive circuit 553. As illustrated in FIG. 27, vibrator 552 includes monitor terminal D501 that outputs the monitor signal, drive terminal D502 for supplying the drive signal to vibrator 552, and detection terminal S that outputs the detection signal.

A configuration and operation of detection circuit 554 will be described below. During a normal operation, the oscillation loop including the drive circuit causes vibrator 552 to generate drive vibration in a predetermined direction at drive vibration frequency fd. When vibrator 552 rotates during the vibration, and rotary inertial force (Coriolis force) is applied to the vibrator, vibration due to the Coriolis force in a direction perpendicular to the drive vibration due to the rotation is generated, and the detection signal (charges) is generated from detection terminal S. The detection signal is then input to detection amplifier 555 provided at an initial stage of detection circuit 554.

An unnecessary component that is a leakage component of the drive vibration is added to the detection signal. The detection signal is generated from the vibration direction perpendicular to the drive vibration, and therefore, both a phase of the detection signal (a component due to the Coriolis force) and a frequency of the unnecessary signal (a leakage component of the drive vibration) are frequency fd. But a phase of the detection signal and a phase of the unnecessary signal are different by 90 degrees. In order to remove this unnecessary component, detector 556 performs synchronous detection of the detection signal by using a reference signal for synchronous detection from drive circuit 553. The reference signal for the synchronous detection is output from phase shifter 559 that applies a predetermined phase shift amount to a signal output from input amplifier 558 of drive circuit 553.

While a constant angular velocity is applied to vibrator 552, a signal that is synchronously detected by detector 556 includes a direct current that is a component due to the Coriolis force, and a component of a frequency of 2×fd due to the unnecessary signal.

Low pass filter 557 removes a component having the frequency of 2×fd due to the unnecessary signal from the detected signal, and outputs a desired angular velocity signal (DC) corresponding to the angular velocity.

Drive circuit 553 includes output amplifier 562 that outputs the drive signal to vibrator 552, power supply unit 564 that supplies a power supply voltage to output amplifier 562, and booster circuit 565 that boosts and controls the power supply voltage.

Booster circuit 565 supplying a boosted voltage obtained by boosting the power supply voltage to output amplifier 562 can increase amplitude of the drive voltage from output amplifier 562.

In vibrator 552, difficulty of mechanical vibration relative to a temperature is different depending on a difference in a structure of vibrator 552 (e.g., difference in weight of an arm that mechanically vibrates, or a size of a space located between a plurality of adjacent arms), a difference in surrounding atmospheric pressure (e.g., difference between a vacuum and atmospheric pressure), or a difference in a material configuring vibrator 552. That is, in physical quantity detection apparatus 551 according to Embodiment 5, when the temperature is a high temperature or a low temperature, the boosted voltage obtained by boosting the power supply voltage is supplied to output amplifier 562 to enable to increase amplitude of the drive voltage from output amplifier 562. Therefore, even in the case where a temperature change is imposed on mechanical amplitude of the vibration of vibrator 552, displacement of vibrator 552 can be increased to enable to increase detection sensitivity of physical quantity detection apparatus 551.

As illustrated in, e.g. FIG. 17, booster circuit 565 includes plural capacitors having the same capacitance to finely switch the boosting ratio, and can suppress reduction in an output current capability. Therefore, physical quantity detection apparatus 551 including the booster circuit according to Embodiment 1 has a small circuit size and low power consumption, and provides excellent sensitivity characteristic in a wide temperature range.

Physical quantity detection apparatus 551 according to Embodiment 5 is an angular velocity sensor, but is not limited thereto. For example, physical quantity detection apparatus 551 according to Embodiment 5 is applicable to, e.g. a vibration type acceleration sensor, a vibration type angular acceleration sensor, a vibration type strain sensor, and a vibration type pressure sensor.

INDUSTRIAL APPLICABILITY

A driver apparatus according to the present invention is useful for a physical quantity detection apparatus, such as an inertial force sensor, and an electronic device, such as a video camera and a digital still camera, which has a small size.

REFERENCE MARKS IN THE DRAWINGS 1 physical quantity detection apparatus
2 vibrator
3 drive circuit
8 input amplifier
10 AGC circuit unit
12 output amplifier
13 temperature detector
14 power supply unit
15 power supply voltage controller
16a, 16b amplitude detector
17 comparator
18 controller
19 booster circuit
91, 91a, 91b driver apparatus
104 detection circuit
105 detection amplifier
106 detector

The invention claimed is:

1. A driver apparatus comprising:
a vibrator configured to vibrate in response to a drive signal input thereto, and to output a monitor signal in accordance with a vibration thereof; and
a drive circuit configured to input the drive signal to the vibrator to vibrate the vibrator,
wherein the drive circuit includes:
an input amplifier configured to amplify the monitor signal and output the amplified monitor signal;
an AGC circuit unit has a gain automatically adjusted based on the signal output from the input amplifier;
an output amplifier configured to receive the drive signal and output the drive signal to the vibrator;
a power supply unit configured to supply a power supply voltage;
a power supply voltage controller configured to boost the power supply voltage, and to supply the boosted power supply voltage to the output amplifier; and
a temperature detector configured to detect a temperature,
wherein the power supply voltage controller is configured to output, to the output amplifier, one of a boosted voltage obtained by boosting the power supply voltage and the power supply voltage selectively in response to the temperature.

2. The driver apparatus according to claim 1, wherein the power supply voltage controller is configured to output the boosted voltage to the output amplifier when the temperature is higher than a predetermined high-temperature-side threshold or is lower than a predetermined low-temperature-side threshold lower than the predetermined high-temperature-side threshold.

3. The driver apparatus according to claim 1,
wherein the power supply voltage controller includes:
a booster circuit configured to receive the power supply voltage and output the boosted voltage; and
a controller configured to control the booster circuit, and
wherein the controller is configured to reduce power supplied to the booster circuit while the power supply voltage controller outputs the power supply voltage to the output amplifier.

4. The driver apparatus according to claim 1,
wherein the drive circuit further includes an amplitude detector configured to detect amplitude of the monitor signal or amplitude of the drive signal, and
wherein the power supply voltage controller is configured to control the power supply voltage based on the amplitude of the monitor signal or the amplitude of the drive signal.

5. The driver apparatus according to claim 4, wherein the power supply voltage controller is configured to selectively output, to the output amplifier, one of the power supply voltage and a boosted voltage obtained by boosting the power supply voltage.

6. The driver apparatus according to claim 5,
wherein the power supply voltage controller includes:
a booster circuit configured to receive the power supply voltage and output the boosted voltage; and
a controller configured to control the booster circuit, and
wherein the controller reduces power supplied to the booster circuit while the power supply voltage controller outputs the power supply voltage to the output amplifier.

7. The driver apparatus according to claim 1,
wherein the drive circuit further includes an amplitude detector configured to detect amplitude of the drive signal,
wherein the amplitude detector includes a comparator configured to compare a voltage of the drive signal output from the output amplifier with the controlled power supply voltage, and
wherein the power supply voltage controller selectively supplies one of the boosted voltage and the power supply voltage to the output amplifier in accordance with a comparison result of the comparator.

8. The driver apparatus according to claim 7, wherein the power supply voltage controller is configured to supply the boosted voltage to the output amplifier when the amplitude of the drive signal is smaller than a predetermined first threshold.

9. A physical quantity detection apparatus comprising:
the driver apparatus according to claim 1; and
a detection circuit including a detection amplifier configured to amplify a detection signal from the vibrator, and
a detector provided at a post stage of the detection amplifier and configured to perform synchronous detection based on a reference signal from the drive circuit.

10. An electronic apparatus comprising:
the physical quantity detection apparatus according to claim 9; and
a circuit connected to the physical quantity detection apparatus.

11. A driver apparatus comprising:
a vibrator configured to vibrate in response to a drive signal input thereto, and to output a monitor signal in accordance with a vibration thereof; and
a drive circuit configured to input the drive signal to the vibrator to vibrate the vibrator,
wherein the drive circuit includes:
an input amplifier configured to amplify the monitor signal and output the amplified monitor signal;
an AGC circuit unit has a gain automatically adjusted based on the signal output from the input amplifier;
an output amplifier configured to receive the drive signal and output the drive signal to the vibrator;
a power supply unit configured to supply a power supply voltage;

a power supply voltage controller configured to boost the power supply voltage, and to supply the boosted power supply voltage to the output amplifier; and an amplitude detector configured to detect amplitude of the monitor signal or amplitude of the drive signal, wherein the power supply voltage controller is configured to control the power supply voltage based on the amplitude of the monitor signal or the amplitude of the drive signal.

12. The driver apparatus according to claim 11, wherein the power supply voltage controller is configured to selectively output, to the output amplifier, one of the power supply voltage and a boosted voltage obtained by boosting the power supply voltage.

13. The driver apparatus according to claim 12, wherein the power supply voltage controller includes:

a booster circuit configured to receive the power supply voltage and output the boosted voltage; and a controller configured to control the booster circuit, and wherein the controller reduces power supplied to the booster circuit while the power supply voltage controller outputs the power supply voltage to the output amplifier.

14. A physical quantity detection apparatus comprising:
the driver apparatus according to claim 11; and
a detection circuit including a detection amplifier configured to amplify a detection signal from the vibrator, and
a detector provided at a post stage of the detection amplifier and configured to perform synchronous detection based on a reference signal from the drive circuit.

15. An electronic apparatus comprising:
the physical quantity detection apparatus according to claim 14; and
a circuit connected to the physical quantity detection apparatus.

16. A physical quantity detection apparatus comprising:
the driver apparatus according to claim 15; and
a detection circuit including a detection amplifier configured to amplify a detection signal from the vibrator, and
a detector provided at a post stage of the detection amplifier and configured to perform synchronous detection based on a reference signal from the drive circuit.

17. An electronic apparatus comprising:
the physical quantity detection apparatus according to claim 16; and
a circuit connected to the physical quantity detection apparatus.

18. A driver apparatus comprising:
a vibrator configured to vibrate in response to a drive signal input thereto, and to output a monitor signal in accordance with a vibration thereof; and
a drive circuit configured to input the drive signal to the vibrator to vibrate the vibrator,
wherein the drive circuit includes:
an input amplifier configured to amplify the monitor signal and output the amplified monitor signal;
an AGC circuit unit has a gain automatically adjusted based on the signal output from the input amplifier;
an output amplifier configured to receive the drive signal and output the drive signal to the vibrator;
a power supply unit configured to supply a power supply voltage;
a power supply voltage controller configured to boost the power supply voltage, and to supply the boosted power supply voltage to the output amplifier; and
an amplitude detector configured to detect amplitude of the drive signal,
wherein the amplitude detector includes a comparator configured to compare a voltage of the drive signal output from the output amplifier with the controlled power supply voltage, and
wherein the power supply voltage controller selectively supplies one of the boosted voltage and the power supply voltage to the output amplifier in accordance with a comparison result of the comparator.

19. The driver apparatus according to claim 18, wherein the power supply voltage controller is configured to supply the boosted voltage to the output amplifier when the amplitude of the drive signal is smaller than a predetermined first threshold.

* * * * *